(12) United States Patent  (10) Patent No.: US 8,253,754 B2
Snyder et al.  (45) Date of Patent: Aug. 28, 2012

(54) SAMPLING-EFFICIENT MAPPING OF IMAGES

(75) Inventors: John M. Snyder, Redmond, WA (US); Don P. Mitchell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 3128 days.

(21) Appl. No.: 09/761,558

(22) Filed: Jan. 16, 2001
(Under 37 CFR 1.47)

(65) Prior Publication Data

US 2002/0126129 A1   Sep. 12, 2002

(51) Int. Cl.
*G06T 15/00* (2006.01)
(52) U.S. Cl. ......... 345/582; 345/441; 345/586; 345/588
(58) Field of Classification Search .................. 345/441, 345/451, 582–588, 619
See application file for complete search history.

(56) References Cited

U.S. PATENT DOCUMENTS

| | | | | |
|---|---|---|---|---|
| 4,899,161 A | * | 2/1990 | Morin et al. | 342/451 |
| 5,341,463 A | * | 8/1994 | Wescott et al. | 345/441 |
| 5,475,802 A | * | 12/1995 | Wescott et al. | 345/441 |
| 6,249,616 B1 | * | 6/2001 | Hashimoto | 382/284 |
| 6,359,617 B1 | * | 3/2002 | Xiong | 345/848 |
| 6,549,651 B2 | * | 4/2003 | Xiong et al. | 382/154 |
| 7,924,294 B2 | * | 4/2011 | Comer | 345/620 |

OTHER PUBLICATIONS

National Atlas of the United States, Map Projections: From Spherical earth to Flat Map, http://nationalatlas.gov/articles/mapping/a_projections.html, Jan. 2011; pp. 1-7.*
US Geological Survey, Map projections, http://egsc.usgs.gov/isb/pubs/MapProjections/projections.html, pp. 1-20, Dec. 2000.*

* cited by examiner

*Primary Examiner* — Phu Nguyen
(74) *Attorney, Agent, or Firm* — Lee & Hayes, PLLC

(57) ABSTRACT

Spherical-like textures are useful to simulate reflections and to generate arbitrary views from a point. For addressing simplicity, graphics systems typically require rectangular arrays of texture samples but an infinite variety of functions can be used to map these samples to a sphere-like object. A new metric is presented for measuring how well various maps use a given number of samples to provide the greatest worst-case frequency content of the image everywhere over the sphere. Using this metric and other important local properties, a comparison is presented of maps used previously in computer graphics as well as other mapping techniques borrowed from cartography. Based on these analysis several novel mapping techniques are presented that are fairly simple to implement and significantly more efficient in terms of the amount of processing and data required, and the quality of the resulting images. The novel metric and mapping techniques can be employed to analyze or otherwise improve the sampling efficiency of mapping textures onto any three-dimensional surface.

54 Claims, 13 Drawing Sheets

| Map name | Sampling Requirement | Minimum Isotropy | Map Components |
|---|---|---|---|
| OpenGL | ∞ | 0 | 1 |
| Cube | 24 | 0.58 | 6 |
| Dual Stereographic | 32 | 1 | 2 |
| Lat/Long | 19.7 | 0 | 1 |
| Dual Equidistant* | 19.7 | 0.64 | 2 |
| Low Distortion Area Preserving* | 19.7 | 0.29 | 1 |
| Polar-Capped* (stretch invariant) | 14.8 | 0.71 | 3 |
| Polar-Capped* (conformal) | 16.5 | 1 | 3 |
| Polar-Capped* (hexagonally reparameterized) | 13.5 | 0.58 | 3 |
| Optimal Isometric** | 12.57 | 1 | ∞ |
| Optimal** | 10.9 | 0.58 | ∞ |
*Fig. 2*
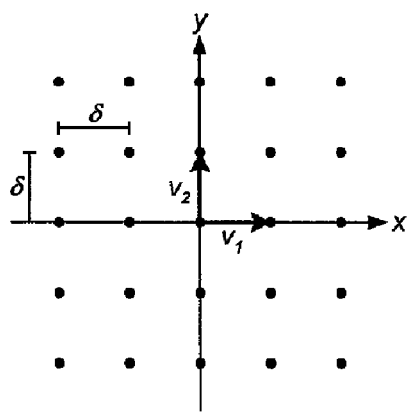
(a) rectangular
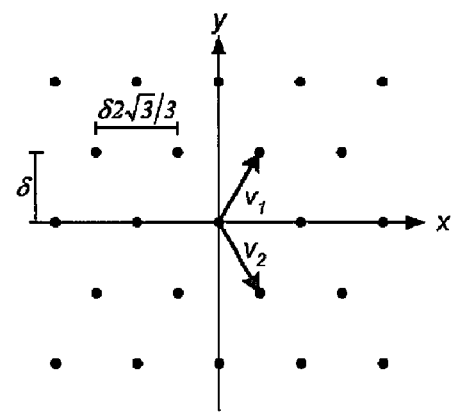
(b) hexagonal
*Fig. 3*

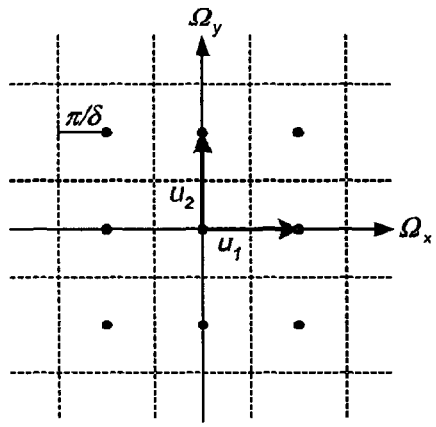
(a) rectangular
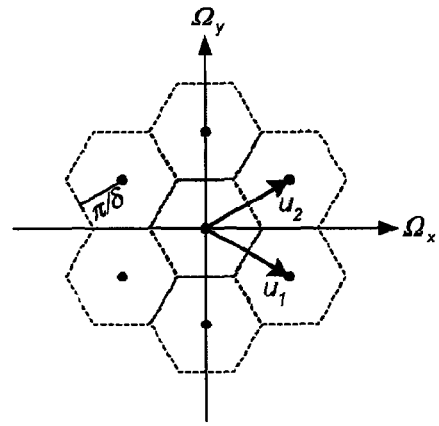
(b) hexagonal
*Fig. 4*
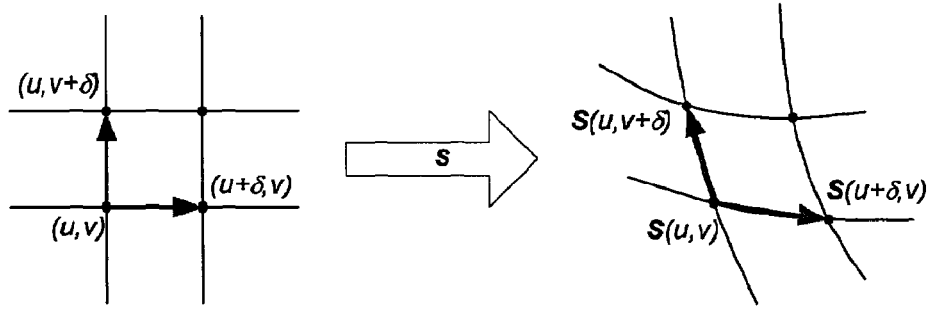
*Fig. 5*

200

| | Equidistant | Gnomonic | Stereographic | Lambert Equal Area |
|---|---|---|---|---|
| $\theta(r)$ | $(\pi/2)r$ | $\cos^{-1}\left(\sqrt{1/(r^2+1)}\right)$ | $\cos^{-1}\left((1-r^2)/(1+r^2)\right)$ | $\cos^{-1}(1-r^2)$ |
| properties | stretch-preserving | projects great circles to lines | conformal, projects circles to circles | area-preserving |
| $r^*$ covering hemisphere | $[0, 1]$ | $[0, \infty]$ | $[0, 1]$ | $[0, 1]$ |
| $r^*$ covering sphere | $[0, 2]$ | – | $[0, \infty]$ | $[0, \sqrt{2}]$ |
| $r(\theta)$ | $2\theta/\pi$ | $\tan\theta$ | $\tan(\theta/2)$ | $\sqrt{1-\cos\theta}$ |
| $\sin\theta$ | $\sin((\pi/2)r)$ | $r/\sqrt{r^2+1}$ | $2r/(1+r^2)$ | $r\sqrt{2-r^2}$ |
| $\cos\theta$ | $\cos((\pi/2)r)$ | $\sqrt{1/(r^2+1)}$ | $(1-r^2)/(1+r^2)$ | $1-r^2$ |
| $\lambda_1(\theta)$ | $\pi/2$ | $\cos\theta$ | $1+\cos\theta$ | $2/\sqrt{1+\cos\theta}$ |
| $\lambda_2(\theta)$ | $(\pi/2)\mathrm{sinc}\,\theta$ | $\cos^2\theta$ | $1+\cos\theta$ | $\sqrt{1+\cos\theta}$ |
| $\alpha(\theta)$ | $\mathrm{sinc}\,\theta$ | $\cos\theta$ | $1$ | $(1+\cos\theta)/2$ |
| $\tau(\theta)$ | $(\pi/2)^2\,\mathrm{sinc}\,\theta$ | $\cos^3\theta$ | $(1+\cos\theta)^2$ | $2$ |
| $\lambda_1^*(\theta)$ | $\pi/2$ | $1$ | $2$ | $2/\sqrt{1+\cos\theta}$ |
| $M_s(\theta)$ | $4\theta^2$ | $4\tan^2\theta$ | $16\tan^2(\theta/2)$ | $16\tan^2(\theta/2)$ |
| inverse map | $f=(\pi/2)\mathrm{sinc}(\cos^{-1}z)$<br>$u=x/f$<br>$v=y/f$ | $u=x/z$<br>$v=y/z$ | $u=x/(1+z)$<br>$v=y/(1+z)$ | $u=x/\sqrt{1+z}$<br>$v=y/\sqrt{1+z}$ |

*Fig. 7*

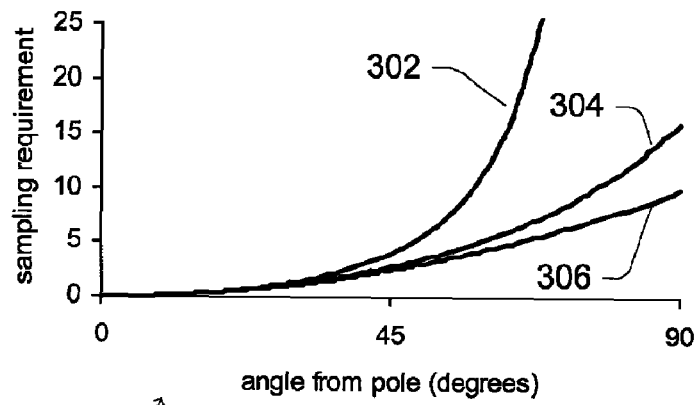
Fig. 8
| Solid | $M_s$ | $\alpha^*$ | Components |
|---|---|---|---|
| tetrahedron | 41.57 | 0.33 | 4 |
| cube | 24 | 0.58 | 6 |
| octahedron | 20.78 | 0.58 | 8 |
| dodecahedron | 16.65 | 0.79 | 12 |
| icosahedron | 15.16 | 0.79 | 20 |
Fig. 9
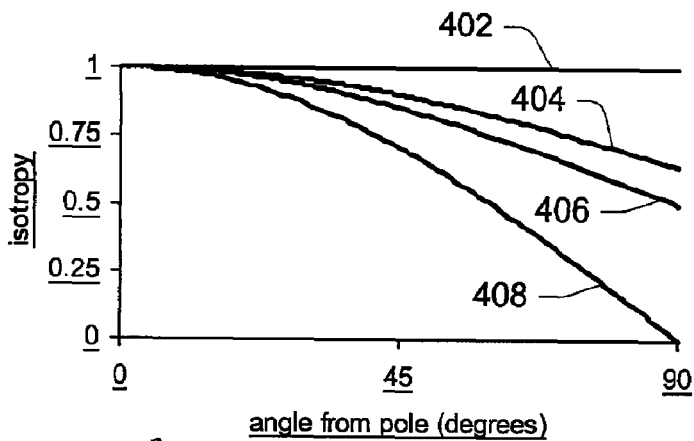
Fig. 10

500

| | Plane Chart | Equal Area | Mercator |
|---|---|---|---|
| $\theta(v)$ | $2\pi v$ | $\sin^{-1} v$ | $\sin^{-1}(\tanh(2\pi v))$ |
| properties | stretch-preserving | area-preserving | conformal |
| v covering sphere | $[-1/4, 1/4]$ | $[-1, 1]$ | $[-\infty, \infty]$ |
| $v(\theta)$ | $\theta/(2\pi)$ | $\sin\theta$ | $\tanh^{-1}(\sin\theta)/(2\pi)$ $= \ln((1+\sin\theta)/(1-\sin\theta))/(2\pi)$ |
| $\cos\theta$ | $\cos(2\pi v)$ | $\sqrt{1-v^2}$ | $\text{sech}(2\pi v)$ $= 2/(e^{-2\pi v} + e^{2\pi v})$ |
| $\sin\theta$ | $\sin(2\pi v)$ | $v$ | $\tanh(2\pi v)$ $= (e^{2\pi v} - e^{-2\pi v})/(e^{2\pi v} + e^{-2\pi v})$ |
| $\lambda_1(\theta)$ | $2\pi$ | $\max(1/\cos\theta, 2\pi\cos\theta)$ | $2\pi\cos\theta$ |
| $\lambda_2(\theta)$ | $2\pi\cos\theta$ | $\min(1/\cos\theta, 2\pi\cos\theta)$ | $2\pi\cos\theta$ |
| $\alpha(\theta)$ | $\cos\theta$ | $\min(1/(2\pi\cos^2\theta), 2\pi\cos^2\theta)$ | $1$ |
| $\tau(\theta)$ | $4\pi^2 \cos\theta$ | $2\pi$ | $4\pi^2 \cos^2\theta$ |
| $\lambda_1^*(\theta)$ | $2\pi$ | $\max(1/\cos\theta, 2\pi)$ | $2\pi$ |
| $M_S(\theta)$ | $2\pi\theta$ | $\max(1/\cos^2\theta, 4\pi^2)\sin\theta$ | $2\pi\tanh^{-1}(\sin\theta)$ $= \pi\ln((1+\sin\theta)/(1-\sin\theta))$ |
| inverse map | $u = (\text{atan2}(y,x))/(2\pi)$ $v = (\sin^{-1} z)/(2\pi)$ | $u = (\text{atan2}(y,x))/(2\pi)$ $v = z$ | $u = (\text{atan2}(y,x))/(2\pi)$ $v = \tanh^{-1} z/(2\pi)$ $= \ln((1+z)/(1-z))/(4\pi)$ |

Fig. 12

SAMPLING-EFFICIENT MAPPING OF IMAGES

TECHNICAL FIELD

This invention relates to computers, graphics software, and image data storage and transmission, and more particularly to improved methods and arrangements for use in generating three-dimensional images, such as, e.g., spherical-like images, using novel sampling-efficient mapping techniques.

BACKGROUND

Computer graphic techniques for mapping textures to three-dimensional surfaces have been developed and implemented in software and hardware. These conventional implementations usually map rectangular texture samples to the surface being rendered. Such texture samples or maps tend to present certain limitations that can significantly degrade or otherwise limit the quality of the rendered image.

Consequently, there is a need for improved computer graphic techniques for mapping textures to three-dimensional surfaces. Preferably, the improved computer graphic techniques will be simpler to implement and suitable for more cost-effective software and/or hardware.

Spherical images representing the radiance field at a point are useful to simulate reflections on shiny surfaces (environment maps). See, for example, Blinn, J. F., and M. E. Newell, "Texture and Reflection in Computer Generated Images", *Communications of the ACM,* 19(10):542-547, October 1976; Greene, N., "Environment Mapping and other Applications of World Projections," *Computer Graphics and Applications,* 6(11):21-29, November 1986; Voorhies, Douglas, and Jim Foran, "Reflection Vector Shading Hardware," *Siggraph '94,* July 1994, 163-166; and, Heidrich, Wolfgang, and H. P. Seidel, "Realistic, Hardware-Accelerated Shading and Lighting," *Siggraph '99,* August 1999, 171-178.

These images are also useful in producing arbitrary views from a point (spherical panoramas), for example, as described by Regan, M. and R. Pose, "Priority Rendering with a Virtual Reality Address Recalculation Pipeline", *Siggraph '94,* 155-162; and, Chen, Shenchang, "QuickTime VR-An Image-Based Approach to Virtual Environment Navigation", *Siggraph '95,* August 1995, 29-38.

In the future, it is expected that the use of such spherical images will become increasingly widespread to increase realism, as well as the use of multiple spherical and hemispherical images per synthetic scene to approximate radiance at many points throughout a rendered environment. See, Miller, G., M. Halstead, and M. Clifton, "On-the-fly Texture Computation for Real-Time Surface Shading," *IEEE Computer Graphics and Applications,* March 1998, 44-58; Heidrich et al. (supra); and, Cabral, B., M. Olano, and P. Nemec, "Reflection Space Image Based Rendering," *Siggraph '99,* August 1999, 165-170, for examples.

Hardware graphics systems tend to perform best when provided with a simple arrangement of samples from a simple domain that can be used to access spherical images and other texture maps. For example, rectangular arrays of samples (e.g., conventional texture maps) are ubiquitous. Such a simple structure provides many advantages including, for example, locality of reference, simplicity of texel addressing, and ease of filtering for reconstruction.

There are other schemes, such as spherical wavelets that exploit local differences in frequency content, however, these schemes tend to be significantly more complicated to implement in a hardware configuration. See, Schröder, P., and W. Sweldens, "Spherical Wavelets: Efficiently Representing the Sphere," *Siggraph '95,* August 1995, 161-172; and, also Schroder, P. and W. Sweldens, "Spherical Wavelets: Texture Processing," in P. Hanrahan and W. Purgathofer, editors, *Rendering Techniques '95,* pp. 252-263, Springer Verlag, Wien, N.Y., 1995, for example.

Consequently, many functions have been used in the past to map samples (information) from a two-dimensional (2D) texture domain to a sphere or sphere-like object. For example, Greene (supra), Regan et al. (supra), and Voorhies et al. (supra) utilize a cube map. Others, utilize an OpenGL map. See, e.g., Haeberli, P., and M. Segal, "Texture Mapping as a Fundamental Drawing Primitive," in *Fourth Eurographics Workshop on Rendering,* June 1993, 259-266; and, the *OpenGL Reference Manual,* Addison Wesley, 1992. Blinn et al. (supra) utilize polar coordinate (e.g., latitude and longitude) maps. Still others, such as, Heidrich et al. (supra) have utilized dual stereographic maps.

Unfortunately, no consistent method has been presented for comparing the different features and/or performance of these and other mapping techniques.

Consequently, there is a need for methods and arrangements that can be implemented to compare certain types of mapping techniques. Moreover, there is a continuing need for new and improved mapping techniques that outperform existing mapping techniques.

SUMMARY

In accordance with certain aspects of the present invention, a novel metric is provided and used to compare various mapping techniques. In accordance with other aspects of the present invention, several novel mapping techniques are presented that significantly outperform many of the conventional mapping techniques, as compared using the metric presented herein.

Thus, the above stated needs and others are met by various methods and arrangements for comparing mapping techniques, and/or implementing novel mapping techniques that are more efficient and/or more effective.

By way of example, one novel mapping technique includes providing a first texture map for a first portion of a three-dimensional surface, the first texture map being associated with a first mapping technique, and providing a second texture map for a second portion of the three-dimensional surface, the second texture map being associated with a second mapping technique that is different from the first mapping technique. In certain implementations, the first texture map includes cylindrical projection information for the first portion, and the second texture map includes azimuthal projection information for the second portion.

In other implementations, the method further includes providing a third texture map for a third portion of the three-dimensional surface, the third texture map being associated with the second mapping technique, and including azimuthal projection information for the third portion. The cylindrical projection information may include projection information, such as, for example, plane-chart projection information, equal area information, or Mercator information. The azimuthal projection information may include projection information, such as, for example, equidistant projection information, stereographic projection information, gnomonic projection information, or equal area projection information.

The resulting texture map set can be stretch-invariant or conformal. In certain further implementations, the cylindrical projection information can be re-parameterized to reduce memory/bandwidth requirements, for example, a hexagonal re-parameterization can be accomplished using a linear transform.

In certain implementations, the first portion is significantly adjacent to both the first and second portions, such that the first portion separates the second and third portions. Thus, for example, the first portion may include cylindrical projection information about the equator of a spherical surface, while the second and third projection information each provide azimuthal projection information over respective poles.

The method of analysis is not limited, however, to spherical surfaces, but may be applied to any three-dimensional surface, curvilinear or not. Additionally, the various texture maps can include information based on different types of sampling matrices, including, for example, a rectangular sampling matrix, a hexagonal sampling matrix, or other like matrices.

The above stated method can be further implemented in a computer-readable medium having computer instructions and/or information suitable for performing or use in the method steps or like processes.

In accordance with other aspects of the present invention, an arrangement is provided that includes memory configured to provide the first texture map and the second texture map, and logic operatively coupled to the memory and configured to output graphically displayable information based on at least a portion of the first and second texture maps. In certain implementations, the arrangement further includes generating logic that is operatively coupled to at least the memory and configured to generate the first texture map using the first mapping technique and the second texture map using the second mapping technique. The memory and logic can be provided within at least one computer, and the computer may further include a display mechanism that is operatively coupled to the logic and configured to receive and display the displayable information.

A polar-capped map set for use in computer generated graphics is also provided in accordance with still other aspects of the present invention. Here, the polar-capped map set includes a cylindrical projection map and at least one azimuthal projection map. The polar-capped map can be a stretch-invariant map or a conformal map.

BRIEF DESCRIPTION OF THE DRAWINGS

A more complete understanding of the various methods and arrangements of the present invention may be had by reference to the following detailed description when taken in conjunction with the accompanying drawings wherein:

FIG. 2 is a table summarizing certain comparison metrics associated with various existing and novel mapping techniques.

FIG. 3(a-b) graphically depicts certain exemplary sampling techniques associated with a plane.

FIG. 4(a-b) graphically depicts the Fourier transform of discrete signals from two exemplary sampling techniques.

FIG. 5 graphically depicts the functional mapping of sampled information from a plane to a three-dimensional surface.

FIG. 7 is a table showing certain mathematical properties associated with the different exemplary azimuthal projection maps in FIG. 6.

FIG. 8 is a chart depicting the sampling requirements of the different exemplary azimuthal projection maps in FIG. 6 as a function of angular coverage.

FIG. 9 is a table depicting sampling requirements, minimum isotropies and number of components required for different gnomonic projection maps.

FIG. 10 is a graph depicting the anisotropy of the different exemplary azimuthal projection maps in FIG. 6 as a function of angle from the pole.

FIG. 12 is a table showing certain mathematical properties associated with the different exemplary cylindrical projection maps in FIG. 11.

DETAILED DESCRIPTION

Figure 1:
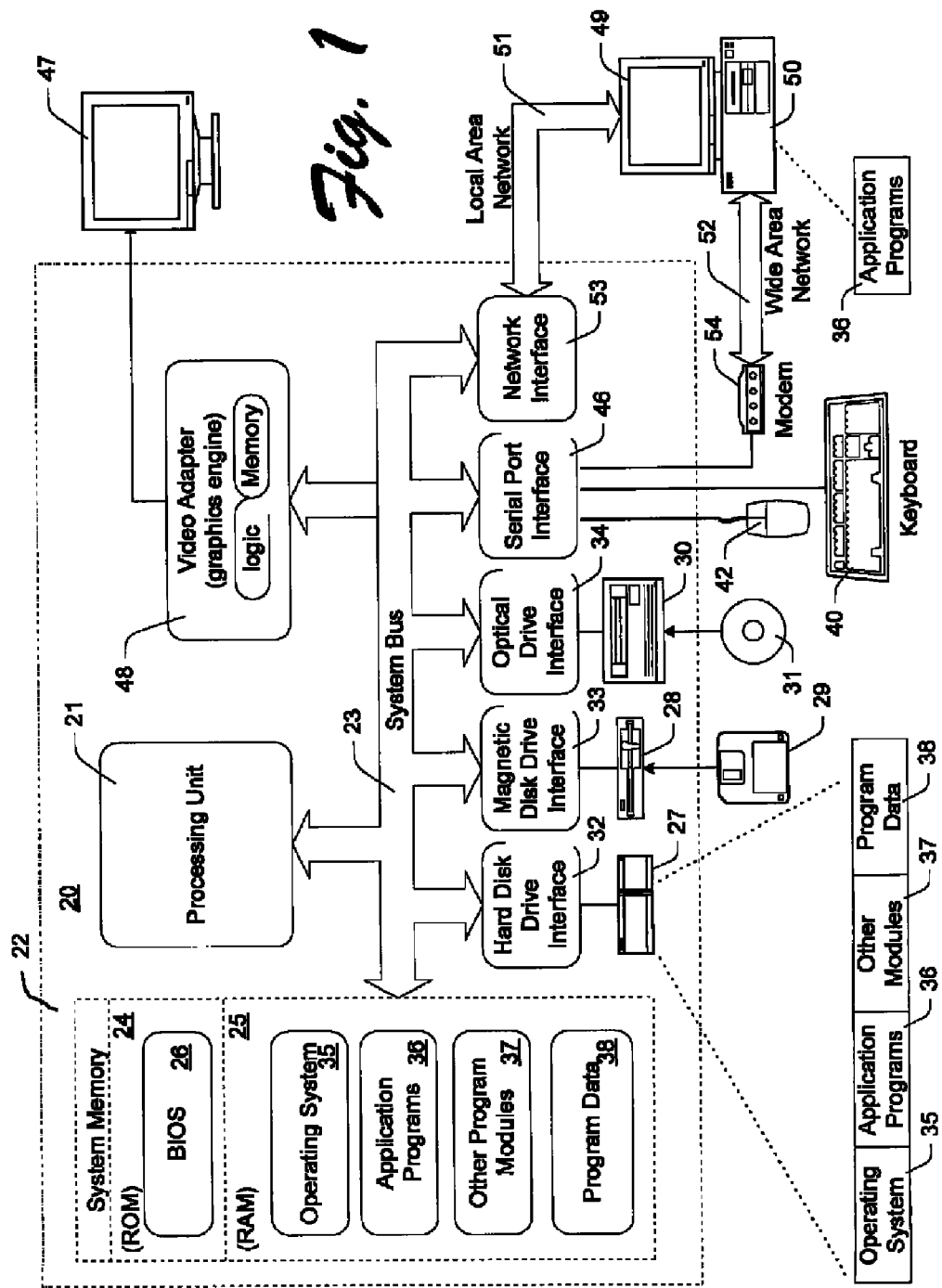
FIG. 1 is a block diagram depicting an exemplary operating environment suitable for use with the present invention.

Exemplary Operating Environment:

With reference to FIG. 1, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Other input devices (not shown) may include a microphone, joystick, game pad, satellite dish, scanner, camera, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 48. Video adapter 48 typically provides a graphics rendering capability that may include additional logic and memory functions. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

The exemplary operating environment having now been discussed, the remaining part of this description is directed towards describing various exemplary aspects and exemplary implementations of the present invention.

Introduction to Comparing Mapping Techniques:

While the following examples map samples to spherical images, it should be understood that any 3D image could be substituted.

With this in mind, to determine how well certain mapping techniques perform, one must first establish comparison criteria. After careful consideration, the following comparison criteria was determined to be particularly relevant given the current state of the art:

(1) Sampling efficiency. Here, to perform well a mapping technique or function should support the greatest worst-case frequency content in the spherical image using the fewest samples. A worst-case metric is preferred by assuming that "blurry" spots or regions as a result of the mapping technique are undesirable, even if designed to allow greater fidelity elsewhere. Hence, good worst-case maps also exhibit less variation in sharpness because variations represent an opportunity to improve the metric by redistributing samples. Furthermore, minimizing texture samples is considered important to conserve graphics memory and/or reduce related texture bandwidth requirements.

(2) Anisotropy: Isotropic filtering methods (e.g., trilinear interpolation within a MIPMAP, see, Williams, Lance, "Pyramidal Parametrics," *Siggraph* '83, July 1983, 1-11) tend to penalize maps having significant anisotropy, since they often cause excessive blur in a locally compressed direction. Even hardware having anisotropic filtering capability will not usually tolerate unbounded anisotropy, though isotropy values down to 0.5 are handled with hardware implementations such as Nvidia's TNT. See, e.g., Hüttner, T., and W. Straβer, "Fast Footprint MIPmapping," in *Proceedings* 1999 *Eurographics/Siggraph Workshop on Graphics Hardware*, August 1999, 35-43.

(3) Simplicity of projection function: Here, texture coordinate generation by the graphics system/subsystem should be computable fairly quickly and easily.

(4) Ease of geodesic interpolation: Simple (e.g., linear) interpolation over the domain should closely approximate geodesic interpolation over the sphere.

(5) Ease of creation: Preferably, mappings should be suitable for dynamic creation using the rendering hardware. Note though that maps can be re-parameterized using an additional rendering pass over a textured, tessellated sphere.

Another important aspect of mapping functions is the use of map components, such as the six faces of the cube map or two hemispheres in a dual stereographic map. Those skilled in the art will recognize that given enough components, or "pieces" in a piecewise map, sampling efficiency can be increased to an asymptotic limit. However, there is a price to pay in the form of more complexity in the projection function and reconstruction filtering, reduced locality of reference, and greater difficulty in MIPMAP construction. Equally important, efficiency gains may be lost because of the difficulty in packing many small maps in a texture rectangle without wasting area. For these reasons, only maps having at most a few components are practical.

This detailed description formally defines sampling efficiency for texture mapping functions over regular 2D lattices by applying results from signal processing and crystallography to spatially-varying mappings: see, e.g., Peterson, D. P., and D. Middleton, "Sampling and Reconstruction of Wave-Number Limited Functions in N-Dimensional Euclidean Spaces," *Information and Control*, 5(1962), 279-323; and Brillouin, L., *Science and Information Theory*, Academic Press, 105-111, 1956, respectively.

It will be shown that a conservative bound on sampling efficiency is given by considering the largest singular value of the Jacobian over the domain. Using sampling efficiency and other important properties like anisotropy, one can compare maps used previously in computer graphics as well as other mappings from cartography, for example, see Robinson, Arthur, *Elements of Cartography*, John Wiley & Sons, New York, 1960.

Additionally, several new mapping functions are presented, including the polar-capped map and dual equidistant map, having superior sampling efficiency and reduced anisotropy. The new maps have simple-to-evaluate projection functions that can be implemented using existing hardware to reduce storage and bandwidth requirements and avoid anisotropic blur of spherical images. This description also provides certain theoretical limits on the efficiency attainable by any piecewise-differentiable map to a sphere.

Exemplary analysis results are summarized in a table 100 depicted in FIG. 2. Here, maps 102 represent conventional maps, maps 104 represent new maps as described in greater detail below, and the maps 106 represent theoretical limits rather than actual maps.

With reference to table 100, the sampling requirement is proportional to the texture area required for a desired frequency content in the worst case; this quantity is defined in greater detail below. Minimum isotropy values closer to 1 are better and represent the degree of local conformality.

Thus, for example, OpenGL's map is clearly a poor choice since its infinite sampling requirement simply means that the required number of samples to achieve an increasing frequency content grows faster than quadratically. A latitude/longitude map tends to be the most efficient of maps 102, but suffers from unbounded anisotropy that causes extreme blurring at the poles.

As demonstrated herein, using new maps 104, in accordance with certain exemplary implementations, we are able to save about 44% over the cube map with no more anisotropy and half as many components (hexagonally re-parameterized polar-capped), about 48% over the dual stereographic map retaining conformality with one extra component (conformal polar-capped), and about 38% over the dual stereographic with somewhat more anisotropy but still using two components (dual equidistant).

Sampling Efficiency and Other Local Mapping Properties:

Here, a spherical mapping function, $S(u,v)$, is defined as mapping 2D points in a plane with parameters $(u,v)$ to 3D unit-length vectors. Practical mapping functions usually cover the sphere from a simple parameter domain, D, such as one or more rectangles or perhaps triangles, using a regular sampling pattern such as a rectangular or hexagonal arrangement. Existing graphics systems tend to utilize rectangular domains and sampling patterns. Each $(u,v)$ sample from the tabulated spherical image, therefore, represents the radiance associated with vector $S(u,v)$, typically stored as a red-green-blue (RBG) triple.

To analyze frequency content, we will make use of the idea of circularly bandlimited functions: functions whose frequency content in any direction is less than a given threshold, or in other words, whose Fourier transform has support inside a disk. This notion of bandlimiting is more appropriate than others like rectangular (separable) bandlimiting, since texture maps can be arbitrarily rotated when projected to the screen. Unlike separable bandlimiting, circular bandlimiting ensures no frequencies are introduced that can alias at other orientations, notably the high diagonal frequencies that occur with separable bandlimiting.

Analysis of sampling efficiency is first developed for regular lattices in the plane. We then extend this analysis to spatially varying mappings by locally projecting the sampling grid onto the tangent plane at each point and applying the same planar analysis as described in the following section. Additional sections present exemplary mathematics for the analysis of local distortion (anisotropy).

Sampling in the Plane:

A regular sampling pattern in the plane can be represented as a sampling matrix, $v \equiv (v_1\ v_2)$, where $v_1$ and $v_2$ are linearly independent vectors to two nearest-neighbor sample locations. For example, isotropic rectangular and hexagonal sampling have the following sampling matrices:

$$V_{rect} \equiv \begin{bmatrix} 1 & 0 \\ 0 & 1 \end{bmatrix}\delta,\ V_{hex} \equiv \begin{bmatrix} \sqrt{3}/3 & \sqrt{3}/3 \\ 1 & -1 \end{bmatrix}\delta$$

where $\delta$ represents the sample spacing. The corresponding sample geometries are depicted in FIG. 3(*a*) for a rectangular sampling and FIG. 3(*b*) for a hexagonal sampling. The various sample locations are derived using $t=Vn$ where $n \equiv (n_1, n_2)'$ is a vector of integers (here, prime denotes transpose).

Denote the continuous signal to be sampled as $\tilde{f}(t)$. The corresponding sampled version, $f(n)$, is given by $$f(n) = \tilde{f}(t) = \tilde{f}(Vn).$$

Taking the Fourier transform of $\tilde{f}$ and then its inverse, $$\tilde{F}(\Omega) \equiv \int_{-\infty}^{+\infty} \tilde{f}(t)\exp(-i\Omega't)dt$$

$$\tilde{f}(t) = \frac{1}{4\pi^2}\int_{-\infty}^{+\infty} \tilde{F}(\Omega)\exp(i\Omega't)d\Omega$$

where $\Omega \equiv (\Omega_x\ \Omega_y)'$ is in units of radians per unit length.

Doing the same for the discrete signal, f, we get $$F(\omega) \equiv \sum_n f(n)\exp(-i\omega'n) \qquad (1)$$

$$f(n) = \frac{1}{4\pi^2}\int_{-\pi}^{+\pi} F(\omega)\exp(i\omega'n)d\omega$$

where $\omega \equiv (\omega_x\ \omega_y)'$ is in units of radians. So $$f(n) = \tilde{f}(Vn) = \frac{1}{4\pi^2}\int_{-\infty}^{+\infty} \tilde{F}(\Omega)\exp(i\Omega'Vn)d\Omega.$$

Substituting $\omega = V'\Omega$ yields $$f(n) = \frac{1}{4\pi^2}\int_{-\infty}^{+\infty} \frac{1}{|detV|}\tilde{F}(V'^{-1}\omega)\exp(i\omega'n)d\omega.$$

The double integral in the $(\omega_x, \omega_y)$-plane can be broken into an infinite sum of integrals each covering a square area of $4\pi^2$:

$$f(n) = \frac{1}{4\pi^2} \sum_{k_x} \sum_{k_y} \int_{-\pi+2\pi k_x}^{\pi+2\pi k_x} \int_{-\pi+2\pi k_y}^{\pi+2\pi k_y} \frac{1}{|detV|} \tilde{F}(V'^{-1}\omega)\exp(i\omega'n)d\omega$$

Replacing $\omega_x$ by $\omega_x - 2\pi k_x$ and $\omega_y$ by $\omega_y - 2\pi k_y$ removes the dependence of integration limits on k:

$$f(n) = \frac{1}{4\pi^2} \sum_{k_x} \sum_{k_y} \int_{-\pi}^{+\pi} \int_{-\pi}^{+\pi} \frac{1}{|detV|} \quad (2)$$
$$\tilde{F}(V'^{-1}(\omega - 2\pi k))\exp(i\omega'n)\exp(i2\pi k'n)d\omega$$

The second exponential term is always 1 since k is an integer-valued vector. Then equating equations (1) and (2) implies that $$F(\omega) = \frac{1}{|detV|} \sum_k \tilde{F}(V'^{-1}(\omega - 2\pi k)), \text{ or}$$

$$F(V'\Omega) = \frac{1}{|detV|} \sum_k \tilde{F}(\Omega - Uk)$$

where $\equiv 2\pi V'^{-1}$.

$F(V'\Omega)$ is a periodic extension of $\tilde{F}(\Omega)$ where the periodicity is described by the matrix $U=(u_1\ u_2)$. Since $F(\omega)$ is periodic in $\omega_x$ and $\omega_y$ with period $2\pi$, $F(V'(\Omega+Uk))=F(V'\Omega+2\pi k)=F(V'\Omega)$.

Thus the Fourier transform of the discrete signal has a periodicity matrix related to the original sampling matrix via $U=2\pi V'^{-1}$. To eliminate aliasing, one needs to bandlimit $\tilde{f}(t)$ such that its Fourier transform, $\tilde{F}(\Omega)$, is zero outside a finite region in frequency space. The region is chosen so as to have no overlap between neighboring periodically repeated parts or tiles of $F(V'\Omega)$. For the rectangular and hexagonal sampling matrix examples, we have $$U_{rect} \equiv \begin{bmatrix} 2 & 0 \\ 0 & 2 \end{bmatrix} \frac{\pi}{\delta}, U_{hex} \equiv \begin{bmatrix} \sqrt{3} & \sqrt{3} \\ 1 & -1 \end{bmatrix} \frac{\pi}{\delta}$$

with frequency space tiles shown in FIG. 4(*a*) and FIG. 4(*b*), respectively.

FIGS. 4(*a-b*) depict the Fourier transform of discrete signals from exemplary sampling matrices. Note that both rectangular (FIG. 4(*a*)) and hexagonal (FIG. 4(*b*)) sampling provide for frequencies up to $\pi/\delta$ in all directions without aliasing. In other words, a frequency radius of $\pi/\delta$ is the largest for an inscribed circle in each periodic tile.

Interestingly though, hexagonal sampling (FIG. 4(*b*)) requires about 13.4% fewer samples to accomplish this, since the circles are packed more tightly in each hexagonal tile, while the square tiles waste space on diagonal frequencies outside the frequency radius. In fact, it can be shown that hexagonal sampling is optimal, in the sense that it has the smallest sampling density of any regular pattern to achieve a given frequency radius.

For such a bandlimited function, inside the periodic tile containing the origin, called the baseband, B, the continuous and discrete Fourier transformed functions are related via $$F(V'\Omega) = \frac{1}{|detV|}\tilde{F}(\Omega)$$

implying that one can reconstruct such bandlimited functions exactly from the discrete samples. In fact, the reconstruction is given by $$\tilde{f}(t) = \frac{|det\ V|}{4\pi^2} \sum_n f(n) \int_B \exp(i\Omega'(t-Vn))d\Omega.$$

Given a sampling matrix V, therefore, one can calculate the radius of the largest inscribed circle in the baseband of its frequency plane; that is, the maximum frequency content in all directions that a circularly bandlimited periodic signal sampled using V can support.

This is calculated by computing $U \equiv 2\pi V'^{-1} = (u_1\ u_2)$ and finding half the minimum distance of the origin to the vectors $n_1 u_1 \pm n_2 u_2$, for integers $n_1$ and $n_2$ not both zero. We thus define the sampling spectral radius, $\Delta$, of the sampling matrix V via $$\Delta \equiv 1/2 \min_{(n_1,n_2)\neq(0,0)}(\|n_1 u_1 - n_2 u_2\|) \quad (3)$$
$$= \frac{\pi}{|det\ V|} \min_{(n_1,n_2)\neq(0,0)}(\|n_1 v_1 - n_2 v_2\|)$$

For the rectangular and hexagonal example samplings, it can be shown that among all sampling matrices having a given sampling spectral radius, the most efficient is always isotropic hexagonal sampling, in that it covers the greatest area with the fewest samples. Sampling density can be measured by $d \equiv 1/|detV|$, for which our example sampling matrices yield $d_{rect} = \delta^2$ and $d_{hex} = 2\sqrt{3}/3\delta^2$.

Mapped Sampling

We are interested in frequency content on a sphere (or sphere-like object, etc.), not the plane. Therefore, we will now locally apply the previous section's analysis of regular sampling patterns in 2D, and examine the worst-case frequency content anywhere in the map's image. For rectangular sampling, squares in parameter space are mapped into "quadrilateral" regions on the sphere, as shown in FIG. 5. We can approximate the spherical samples in the neighborhood of S(u,v) by 2D points projected to the tangent plane there.

Let $S_u(u,v) \equiv \partial S/\partial u(u,v)$ and $S_v(u,v) \equiv \partial S/\partial v(u,v)$. Then an orthonormal basis for the tangent space is given by $(T_1\ T_2)$ $$T_1(u,v) \equiv \frac{S_u}{\|S_u\|}$$
$$T_2(u,v) \equiv \frac{(S_u \cdot S_u)S_v - (S_u \cdot S_v)S_u}{\|S_u\|\tau}$$

where $\tau(u,v) \equiv \sqrt{(S_u \cdot S_u)(S_v \cdot S_v) - (S_u \cdot S_v)^2}$ represents the differential area at (u,v). Letting $J(u,v) \equiv (S_u\ S_v)$, the approximation $$S((u,v)+(\dot{u},\dot{v})) - S(u,v) \approx J(\dot{u},\dot{v})' \quad (4)$$

is good for small $\|\dot{u}, \dot{v}\|$, becoming exact in the limit as the length of the perturbation reaches 0. Since the Jacobian J maps perturbations in any domain direction to the tangent plane, it can be thought of as a "local" sampling matrix.

Alternatively, we can think of the Jacobian as distorting what was formerly simple rectangular sampling in the plane. To derive a 2D sampling matrix, we must project the Jacobian into the plane using the orthonormal basis $(T_1\ T_2)$, a pure rotation that preserves the sampling properties. Defining K as the resulting transformed Jacobian $$K(u,v) \equiv (T_1(u,v)T_2(u,v))'J(u,v) = \frac{1}{\|S_u\|}\begin{bmatrix} S_u \cdot S_u & S_u \cdot S_v \\ 0 & \tau \end{bmatrix}$$

For rectangular sampling with spacing $\delta$, the local sampling matrix mapped by S is then given by $V=\delta K$.

We can now analyze the spectral radius determined by V at any point (u,v) as if S were everywhere equal to the local approximation in equation (4). By selecting the minimum sampling spectral radius for any point in D, we determine the highest permissible frequency, $\Delta^*$, in a circularly bandlimited function rectangularly sampled with spacing $\delta$ using the given mapping function. Substituting the local sampling matrix into the definition of sampling spectral radius (3) and simplifying, yields the local sampling spectral radius $\Delta(u,v)$ $$\Gamma(u,v) \equiv \frac{\tau(u,v)}{\min_{(n_1,n_2)\neq(0,0)}(\|n_1 S_u + n_2 S_v\|)}$$

$$\Delta(u,v) \equiv \frac{\pi}{\delta\Gamma(u,v)}$$

where $n_1$ and $n_2$ are integers. We call $\Gamma$ the local sampling spectral stretch of the mapping. The minimum local sampling spectral radius over the parameter domain, $\Delta^*$, is then defined via $$\Gamma^* \equiv \max_{(u,v)\in D} \Gamma(u,v)$$

$$\Delta^* \equiv \min_{(u,v)\in D} \Delta(u,v) = \frac{\pi}{\delta\Gamma^*}$$

As expected, for a given mapping function, we can make $\Delta^*$ arbitrarily large by reducing $\delta$, essentially, by adding more samples.

The concept of the sampling stretch can also be generalized to sampling strategies in the domain other than rectangular, by transforming the domain's original 2D sampling matrix (rather than $I\delta$) using K and then finding its sampling spectral radius. In this example, we concentrate on rectangular sampling because of its simplicity, efficiency, and widespread use in graphics systems.

We can now compare efficiencies of various mappings by fixing the sampling spectral radius and determining the number of samples (or equivalently, the sample spacing $\delta$) required to generate that desired frequency content.

The number of samples required to sample the sphere (or indeed any desired portion of the image of any mapping function) is given by $$N \equiv \frac{A}{\delta^2} = \frac{A}{\left(\frac{\pi}{\Gamma^*\Delta^*}\right)^2} = (A\Gamma^{*2})\left(\frac{\Delta^*}{\pi}\right)^2$$

where A is the area of the domain D.

Defining the sampling efficiency of a mapping, $M_s^{-1} \equiv 1/(A\Gamma^{*2})$, then implies that the number of samples required to achieve a minimum spectral radius $\Delta^*$ is $N=(\Delta^*/\pi)^2/M_s^{-1}$. Higher efficiency means fewer samples required for a given spectral radius everywhere in D. We call the reciprocal of sampling efficiency the sampling requirement, defined as:

$$M_s \equiv A\Gamma^{*2}.$$

Local Distortion Analysis:

For hundreds of years, the field of cartography has studied spherical mappings and their properties. In 1881, Tissot analyzed the local deformation induced by spherical mappings in his Mémoire sur la représentation des surfaces et les projections des cartes géographiques. While cartography seeks to optimize perceptual reproduction of the Earth's surface on a flat projection rather than sampling efficiency, its tools of analysis and catalog of maps are nonetheless useful for our purposes.

Starting with Tissot's analysis, a mapping function locally transforms an infinitesimal circle into a general ellipse, with eccentricity and rotation that can be determined from the Jacobian of the mapping. The lengths of the major and minor axes of this ellipse, $\lambda_1$ and $\lambda_2$, are given by the singular values of the Jacobian $$\lambda_1^2(u,v) \equiv \frac{(a+c) + \sqrt{(a-c)^2 + 4b^2}}{2}$$

$$\lambda_2^2(u,v) \equiv \frac{(a+c) - \sqrt{(a-c)^2 + 4b^2}}{2}$$

where $a(u,v) \equiv S_u \cdot S_u$, $b(u,v) \equiv S_u \cdot S_v$, and $c(u,v) \equiv S_v \cdot S_v$ are the entries in the symmetric metric tensor $J'J$. So $\lambda_1$ represents the maximum local stretch or length of the longest vector mapped from the set of unit tangent vectors in the domain, and $\lambda_2$ the maximum compression or length of the shortest mapped vector. The singular values are related to the differential area via $\tau = \lambda_1 \lambda_2$.

We also define the isotropy of the mapping, or $\alpha \equiv \lambda_2/\lambda_2$ where $0 \leq \alpha \leq 1$ whose closeness to 0 is useful for measuring the severity of artifacts from MIPMAP filtering, for example. We call $1/\alpha$ the anisotropy.

Mapping functions can be categorized by their local properties as follows:

isometric $\Rightarrow \lambda_1(u,v) = \lambda_2(u,v) = \eta$ conformal $\Rightarrow \lambda_1(u,v) = \lambda_2(u,v)$ equivalent or area-preserving $\Rightarrow \lambda_1(u,v)\lambda_2(u,v) = \eta$ stretch-preserving $\Rightarrow \lambda_1(u,v) = \eta$ where $\eta$ is a constant and the properties are for all $(u,v) \in D$. The last category is not used formally in cartography, but will be useful in the next section. The first is not possible for smooth spherical mapping functions but only for mappings to developable surfaces. Conformal mappings in computer graphics are discussed, for example, in Fiume, E., A. Fournier, and V. Canale, "Conformal texture mapping", *Proc. of EUROGRAPHICS '87*, Elsevier Science Publishers (North Holland), Amsterdam (1987), 53-64.

There is a close relation between the sampling spectral stretch of a mapping $\Gamma$ and its largest singular value $\lambda_1$, although the two are not identical. We have $\Gamma \leq \lambda_1$ because $$\Gamma = \frac{\tau}{\min_{(n_1,n_2)\neq(0,0)}(\|n_1 S_u + n_2 S_v\|)} =$$

$$\frac{\lambda_1 \lambda_2}{\min_{(n_1,n_2)\neq(0,0)}(\|n_1 S_u + n_2 S_v\|)} = \lambda_1 \frac{\min_{\|(x,y)\|=1}(\|x S_u + y S_v\|)}{\min_{(n_1,n_2)\neq(0,0)}(\|n_1 S_u + n_2 S_v\|)} \leq \lambda_1$$

and since $\|(n_1,n_2)\| \geq 1$ for integers not both 0. Thus $\lambda_1$ is a conservative estimate for the more difficult to calculate $\Gamma$; i.e., when substituted for $\Gamma$ provides a lower bound on the sampling efficiency. Also, in the case of an orthogonal parameterization (in which $b \equiv S_u \cdot S_v = 0$), $\Gamma = \lambda_1$ and $$\lambda_1 = \max(\|S_u\|, \|S_v\|)$$

$$\lambda_2 = \min(\|S_u\|, \|S_v\|)$$

Finally, note that the sampling requirement satisfies $M_s \leq \rho/k$ where $\rho$ is the surface area of the image of the mapping function over the domain D and $k = 2\sqrt{3}/3$. This is because there is no more efficient sampling than isotropic hexagonal sampling, for which the relation can be easily verified for $K(u,v) = v_{hex}$. See, e.g., Peterson et al. (supra). For an isometric map, $M_s = \rho$.

Spherical Maps and Their Efficiencies:

We analyzed the sampling efficiency and local properties of some simple projections from cartography, some of which have appeared in computer graphics. Where possible, we retain the terminology of cartography and relate it to that used in computer graphics.

Figure 6:
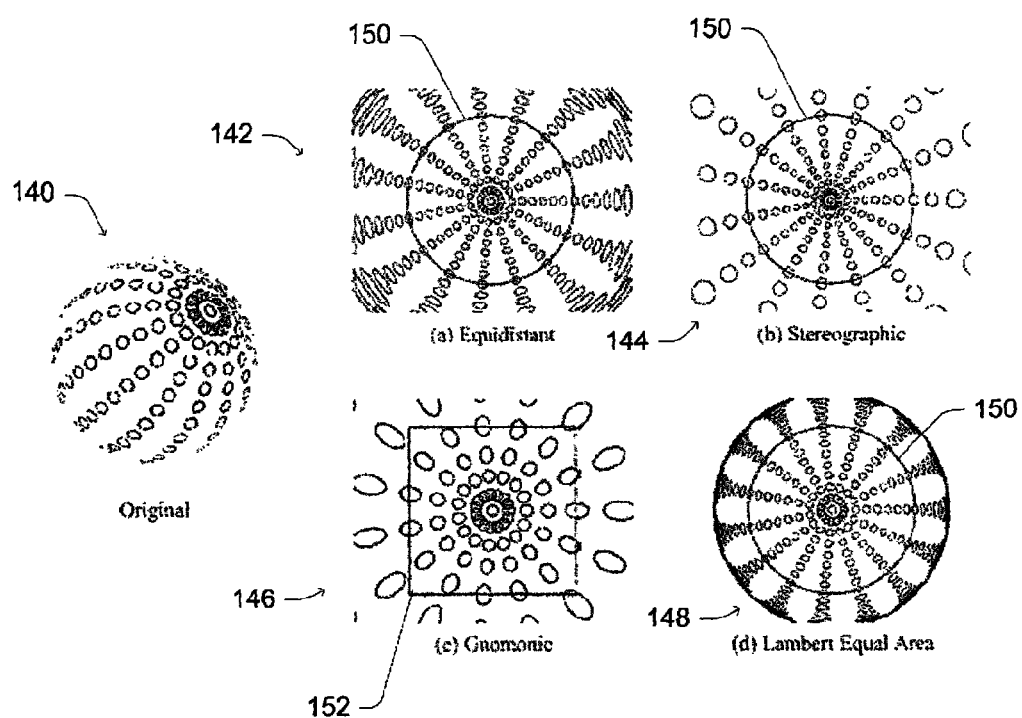
FIG. 6 graphically depicts several different exemplary azimuthal projection maps.

Azimuthal Projections:

FIG. 6 depicts certain exemplary azimuthal projections, based on an original sphere image 140. Here, a plurality of circles, each having a radius of 3.5°, are arranged at intervals of 12.5° in latitude and 22.5° in longitude are projected back into parameter space using the four exemplary azimuthal projections (maps): an equidistant map 142, a stereographic map 144, a Gnomonic (e.g., cube) map 146, and a Lambert equal area (e.g., OpenGL) map 148. A larger circle 150 represents the extent of a hemisphere. For gnomonic map 146, which is unable to represent the entire hemisphere in a finite domain, a single face from the cube map is shown in square 152.

Note that greater mapping stretch is indicated by smaller projected circles in the domain since we are projecting constant size spherical circles back into parameter space.

Azimuthal projections, such as these, transform the sphere into a tangent or intersecting plane such that parallels (lines of constant latitude on the earth) are projected to circles. Of coursed the coordinate system can be arbitrarily rotated so as to be centered about any point rather than the usual north or south pole configuration of a sphere (e.g., the Earth).

Mathematically, these projections may be modeled as $$S(u,v) = ((u/r)\sin \theta(r), (v/r)\sin \theta(r), \cos \theta(r)),$$

$$r = \sqrt{u^2 + v^2}, u, v \in [-r^*, r^*] \quad (5)$$

where $\theta(r) \in [0, \pi]$ arbitrarily re-parameterizes the parallel spacing, and where $\theta = 0$ and $\theta = \pi$ represent the poles.

Table 200, as depicted in FIG. 7, summarizes certain features of the azimuthal projections shown in FIG. 6.

Here, gnomonic map 146 projects the sphere onto a plane tangent to it, using a perspective transformation that looks directly at the point of tangency. It is the projection used in the "cube map" spherical image, for each of the six faces of the cube. Gnomonic map 146 projects great circles on the sphere to straight lines in the map domain, an advantageous property for texture coordinate interpolation. Gnomonic maps 146 can also be directly produced using the perspective projection of the rendering hardware. Note, however, that gnomonic map 146 requires the entire real plane to parameterize a hemisphere.

Stereographic map 144 is a conformal map that also has the property that circles on the sphere project to circles in the domain. Heidrich et al. (supra) proposed dual stereographic maps, one for each hemisphere, to parameterize environment maps.

Lambert equal area map 148 is an area-preserving map also called the "gazing ball" or OpenGL map.

Equidistant map 142 is a stretch-preserving map that also preserves distances to the pole. Although it has not been used in computer graphics, its sampling efficiency exceeds that of the other azimuthal projections, as we will demonstrate shortly.

With more specific reference to the results tabulated in FIG. 7, we define sinc $\theta \equiv \sin \theta/\theta$. Note that the local properties do not vary as a function of the direction of the vector $(u,v)$, only as a function of its length $r = \sqrt{u^2 + v^2}$ or equivalently, $\theta$. The maximum larger singular value, $\lambda_1^*$, and the sampling requirement, $M_s$, are taken over the portion of the sphere from $[0, \theta]$, thus allowing analysis of parts of the sphere from the pole to any parallel, such as the hemisphere ($\theta = \pi/2$). The inverse maps implement the texture coordinate generation required by graphics systems.

The local distortion properties of the four maps can be derived from equation (5) using the respective definition of $\theta(r)$ from table 200. To derive the sampling efficiency of these maps, first note that the singular values of the projections are invariant over any circle in the domain centered at the origin, $D_r\{(u,v) | u^2 + v^2 = r^2\}$. It can also be shown that the metric tensor entries are given by $$a = u^2 d + e, c = v^2 d + e, |b| = uvd$$

where $$d \equiv \frac{\lambda_1^2 - \lambda_2^2}{r^2}, e \equiv \lambda_2^2$$

and $d, e \geq 0$. Then sampling spectral stretch $\Gamma^2$ is given by $$\Gamma^2 = \frac{\lambda_1^2 \lambda_2^2}{\min_{(n_1,n_2)\neq(0,0)}(n_1^2 a - 2n_1 n_2 |b| + n_2^2 c)}$$

Maximizing $\Gamma^2$ over a domain circle $D_r$ requires minimizing the denominator above, since the numerator is invariant over $D_r$; denote this maximum as $\Gamma_r^2$. Examining the denominator, which we denote $\gamma^2$, $$\gamma^2 = \min_{(n_1,n_2)\neq(0,0)}(n_1^2 a - 2n_1 n_2 |b| + n_2^2 c)$$

$$= \min_{(n_1,n_2)\neq(0,0)}((n_1^2 + n_2^2)e + (n_1^2 u^2 - 2n_1 n_2 uv + n_2^2 v^2)d)$$

$$= \min_{(n_1,n_2)\neq(0,0)}((n_1^2 + n_2^2)e + (n_1 u - n_2 v)^2 d)$$

It can be seen that the minimum value of $\gamma^2$ over $D_r$, which we denote $\gamma_r^2$, occurs at $(n_1, n_2)=(0,1)$, $(u,v)=(r,0)$ (or equivalently at $(n_1,n_2)=(1,0)$, $(u,v)=(0,r)$), since d, $e \geqq 0$ and the integer factors can not both be zero.

Thus, $\gamma_r^2 = e = \lambda_2^2(r)$ so $\Gamma_r^2 = \lambda_1^2(r)$; in words, for any azimuthal projection, the maximum spectral stretch over a circle centered at the pole is the same as the larger singular value anywhere on the circle.

The sampling requirement tabulated in FIG. 7 is then given by the domain area times the square of the maximum $\lambda_1$; i.e., $$M_s(\theta) = 4r^2(\theta)\lambda_1^{*2}(\theta) \text{ where}$$

$$\lambda_1^*(\theta) \equiv \max_{\varphi \in [0,\theta]} \lambda_1(\varphi)$$

While this domain is properly a disk in 2D, we take its area as $4r^2$ rather than $\pi r^2$ to calculate efficiency with the assumption that the disk samples must be embedded in a square to allow a practical indexing scheme. Because equidistant map 142 is stretch-invariant, its maximum spectral stretch does not depend on r, and thus has optimal sampling efficiency among all azimuthal projections.

FIG. 8 depicts a graph 300 of sampling requirements of azimuthal maps as a function of angular coverage for portions of the sphere up to a hemisphere.

As depicted by line 302, a single gnomonic map 146 cannot encompass the entire hemisphere, since its sampling requirement becomes unbounded. Equidistant map 142 (line 306) has sampling requirement $M_s(\pi/2)=4(\pi/2)^2 \approx 9.87$ while both the stereographic map 144 and Lambert equal area map 148 (line 304) have $M_s(\pi/2)=16 \tan^2(\pi/4)=16$.

Consequently, to cover the sphere, it is more efficient to use two maps each covering a hemisphere (called a dual projection) rather than a single one covering the entire sphere. In fact, both stereographic map 144 and Lambert equal area map 148 have an unbounded sampling requirement when used to cover the entire sphere, but for different reasons. Stereographic map 144 requires the entire real plane to cover the sphere while the equal area projection has unbounded spectral stretch at the opposite pole.

Interestingly, the use of six gnomonic maps 146 for each face of the cube provides a sampling requirement of 24, which is better than dual Lambert equal area maps 148 or stereographic maps 144 with a sampling requirement of 32, but not as good as dual equidistant maps 142 at about 19.74. For reference, these numbers can be compared to the surface area of the unit sphere, $\rho=4\pi \approx 12.57$.

This analysis tends to contradict an implication by Heidrich et al. (supra) that the dual stereographic projection is superior to the cube face map for sampling efficiency. Heidrich et al. correctly observe that the differential area for the stereographic map in a hemisphere varies by a factor of 4, while for the cube map it varies by more than a factor of 5 over the face. While true, this is less important than the factor of 2 greater spectral stretch at the pole generated by the stereographic compared to the gnomonic projection. The inefficient use of domain area by the cube map takes place over the relatively small corner regions; in total it is still about 25% more efficient that a dual stereographic map.

As described below, in accordance with certain implementations of the present invention, there are ways to further improve this advantage of equidistant map 142.

It is easy to show that the sampling efficiency of a set of gnomonic maps 146, one for each face of a polyhedron circumscribing a sphere, is given by the surface area of that polyhedron. This is because the maximum spectral stretch of gnomonic map 146 is "1" and occurs at the center (pole) of the projection within each face; the domain area is the same as the area of the face.

Table 320, in FIG. 9, lists sampling requirements, $M_s$, and minimum isotropies, $$\alpha^* \equiv \min_{(u,v) \in D} \alpha(u, v),$$

of gnomonic map sets covering a sphere and generated from the platonic solids. Here, it is assumed that triangular faces can be represented using triangular sampling arrays rather than embedded in a square:

Note that the sampling efficiency of dual equidistant maps is still better than the octahedral gnomonic map set. By using gnomonic maps derived from tessellations of more and more faces, we can approach but never attain the sampling requirement of an isometric map of $4\pi$. Using more than a few map components greatly complicates the projection function (i.e., texture coordinate generation) as well as efficient texture access by hardware systems.

FIG. 10 depicts a graph 400 showing anisotropy for azimuthal maps as a function of angle from the pole. Recall that isotropy values near 1 are desirable for hardware incapable of anisotropic filtering, and conversely values near 0 are undesirable.

In graph 400, stereographic map 144 (line 402) is best since it is conformal, but equidistant map 142 (line 404) exhibits little anisotropy for angles less than about 45°, where its isotropy is $\alpha(\pi/4)=2\sqrt{2}/\pi \approx 0.9$. This can be compared to its still reasonable isotropy at the equator, $\alpha(\pi/2)=2/\pi \approx 0.64$. Gnomonic map 146 (line 408) presents the worst-case anisotropy at the greatest angular distance from the pole. For example, the cube map has the "worst case" isotropy of $1/\sqrt{3} \approx 0.58$ at the cube vertices. As shown, the isotropy of Lambert equal area map 148 (line 406) falls between equidistant map 142 (line 404) and gnomonic map 146 (line 408).

Cylindrical Projections:

Cylindrical projections transform the sphere to a tangent or intersecting cylinder such that parallels are projected to straight lines, with the model $$S(u,v)=(\cos(2\pi u)\cos\theta(v), \sin(2\pi u)\cos\theta(v), \sin\theta(v)),$$
$$u \in [-1/2, 1/2], \theta(v) \in [-\pi/2, \pi/2]$$

where $\theta(v)$ arbitrarily re-parameterizes the parallel spacing, and where $\theta=-\pi/2$ and $\theta=\pi/2$ represent the poles, and $\theta=0$ the equator. Three important cylindrical projections, the plane chart, equal area, and Mercator projection, are illustrated in FIG. 11.

Figure 11:
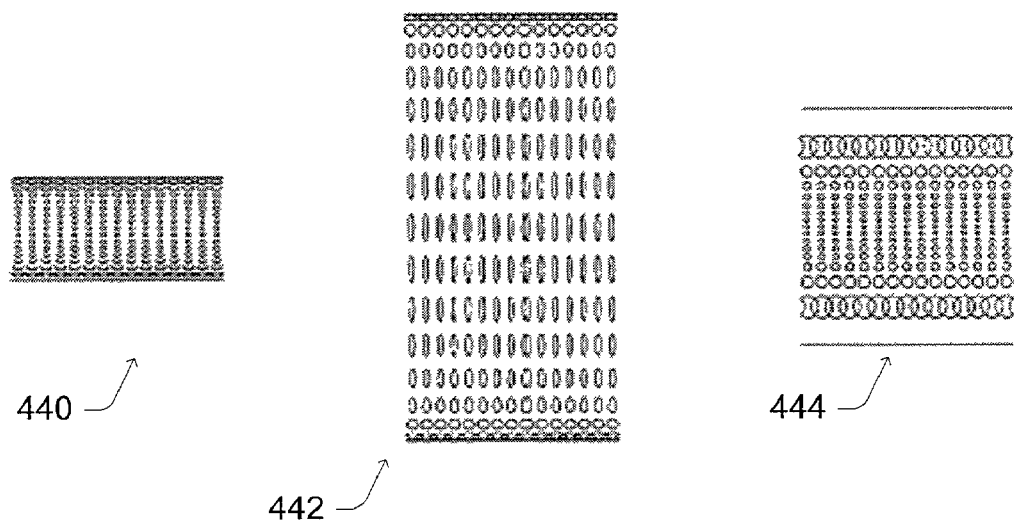
FIG. 11 graphically depicts several different exemplary cylindrical projection maps.

FIG. 11 depicts exemplary cylindrical projections, where spherical circles are distributed (as shown in FIG. 6) and projected into the parameter space of the three cylindrical mappings. Here, u values are charted horizontally and v values vertically.

FIG. 11 includes an exemplary plane chart cylindrical map 440, an equal area cylindrical map 442, and a Mercator cylindrical map 444. Certain mathematical properties associated with these cylindrical maps are tabulated in Table 500 in FIG. 12.

With reference to FIG. 11, note that Mercator map 444 has an unbounded domain in v, but only the spherical area very close to the poles is greatly stretched: the 3.5° spherical circles surrounding the poles map to the horizontal lines shown at the top and bottom.

Plane chart cylindrical map 440 is a standard latitude/longitude parameterization of the exemplary sphere. It is also stretch-preserving. As its name implies, equal area cylindrical map 442 preserves area. Finally, Mercator map 444 is a conformal projection useful for navigation since it projects loxodromes on the sphere, or curves making a constant angle with the meridians, into straight lines. Since all cylindrical projections are orthogonal, their spectral stretch is identical to their larger singular value, simplifying the analysis of sampling efficiency.

With reference to table 500, the maximum singular value and sampling requirement are taken over the part of the sphere from [0, θ]; i.e., from the equator to the θ parallel. Local properties of the cylindrical projections are invariant with respect to u, depending only on v or inverting, θ.

Figure 13:
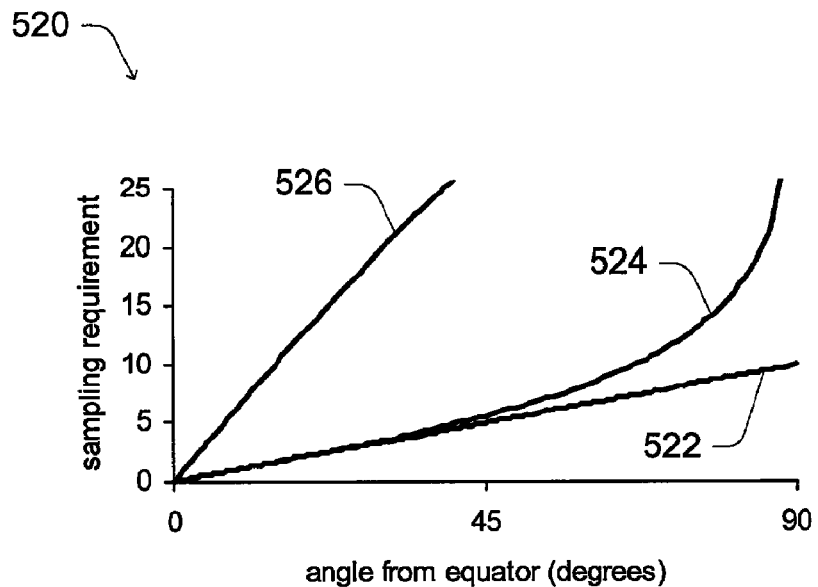
FIG. 13 is a chart depicting the sampling requirements of the different exemplary cylindrical projection maps in FIG. 11 as a function of angular coverage.

To analyze the sampling efficiency, we consider the portion of the sphere from the equator to an angle $\theta \leq \pi/2$. The sampling requirement in table 500 is further depicted in graph 520 of FIG. 13, and is given by $$M_s(\theta) = v(\theta)\lambda_1^{*2}(\theta) \text{ where}$$

$$\lambda_1^*(\theta) = \max_{\varphi \in [0,\theta]} \lambda_1(\varphi)$$

since the domain area is equal to v(1/2−−1/2)=v.

Graph 520 depicts the sampling requirements of these exemplary cylindrical maps as a function of angular coverage. As depicted, plane chart cylindrical map 440 (line 522) has the highest sampling-efficiency because it is stretch-invariant, just as the equidistant map 142 is best among azimuthal projections. Covering the hemisphere using plane chart cylindrical map 440 has a sampling requirement $M_s(\pi/2) = 2\pi(\pi/2) \approx 9.87$, which is identical to that of the azimuthal equidistant map 142. Each of remaining two cylindrical maps (442 and 444) have unbounded sampling requirement for hemispherical coverage. Cylindrical equal area map 442 (line 526), in fact has very poor sampling efficiency for any angular coverage, while Mercator cylindrical map 444 (line 524), at least for angles not more than about 45°, is only slightly worse than plane chart cylindrical map 440, with the advantage of conformality.

Figure 14:
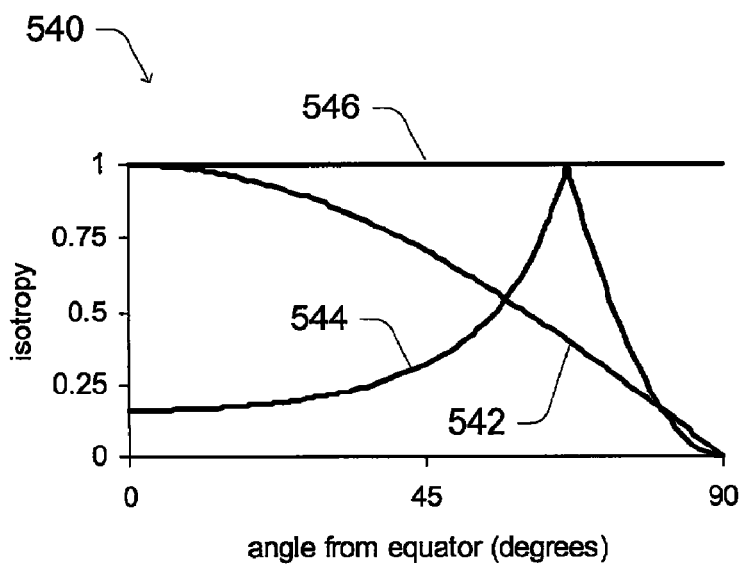
FIG. 14 is a chart depicting the anisotropy of the different exemplary cylindrical projection maps in FIG. 11 as a function of angle from the equator.

The anisotropy of these exemplary cylindrical maps is depicted in graph 540 of FIG. 14. Here, in can be noted that for small angles from the equator, plane chart cylindrical map 440 (line 542) exhibits little anisotropy, but its anisotropy increases without bound near the pole making it a poor choice for MIPMAP texturing. For example, at 45°, plane chart cylindrical map 440 (line 542) has isotropy $\alpha(\pi/4) = \sqrt{2}/2 \approx 0.71$. Cylindrical equal area map 442 (line 544) has poor anisotropy (except near the single value $\theta = \cos^{-1}(1/\sqrt{2\pi}) \approx 66.5°$) as well as sampling efficiency. Mercator cylindrical map 444 (line 546) maintains an isotropy of "1".

Low-Distortion Area-Preserving Map:

We also present results for an unusual sphere mapping developed for use in a stochastic ray tracer. This mapping was designed to project stratified sampling patterns (and other specialized sampling patterns) onto the sphere and to project spherical samples into 2D histogram bins. To solve those problems, the mapping had to be a bijection between the unit square and the unit sphere, area-preserving, and not severely anisotropic. It's projection, $(u,v) = S^{-1}(x,y,z)$, is defined by the composition of three area-preserving bijections. The first is a mapping from a hemisphere to a disk:

$$(u,v) = (x,y)/\sqrt{1+z}$$

The second mapping is from a disk to a half disk:

$$(r',\theta') = (r,\theta/2)$$

Thus the two halves of a sphere are converted into half disks, which are joined to form a single disk. The third mapping is Shirley's area-preserving bijection between the disk and the unit square. See, Shirley, Peter and Kenneth Chiu, "A Low Distortion Map Between Disk and Square", Journal of Graphics Tools, Vol 2, No 3, pp 45-52, 1997.

This leaves us with an image of the sphere on the unit square, where the north and south poles are both mapped to the center of the square. If we roll the mapping halfway, the north pole will be on one edge of the square, the south pole on the opposite edge, and the interior of the square will be $C_0$ continuous. See, an exemplary Earth map projection in FIG. 20.

Numerical analysis of this low distortion equal area mapping, in accord with the metric presented above, shows the sampling efficiency to be about 19.7, about the same as the plane chart and dual equidistant mappings. Its worst-case isotropy is about 0.29.

Polar-Capped Maps:

Based on the analysis/metric presented above, azimuthal and cylindrical projections can be considered complimentary, in that azimuthal projections tend to have better sampling efficiency and less anisotropy near the pole, while cylindrical projections are better near the equator.

We can therefore both improve sampling efficiency and reduce anisotropy by employing a multiple-component map set that includes both azimuthal projection information and cylindrical projection information. For example, in certain implementations, a three-component map set is provided having azimuthal projections or maps for each of the two poles and a cylindrical projection or map for the area there between (e.g., near the equator). We call such a map a "polar-capped map" and analyze the properties of two exemplary implementations in the next sections.

Figure 15:
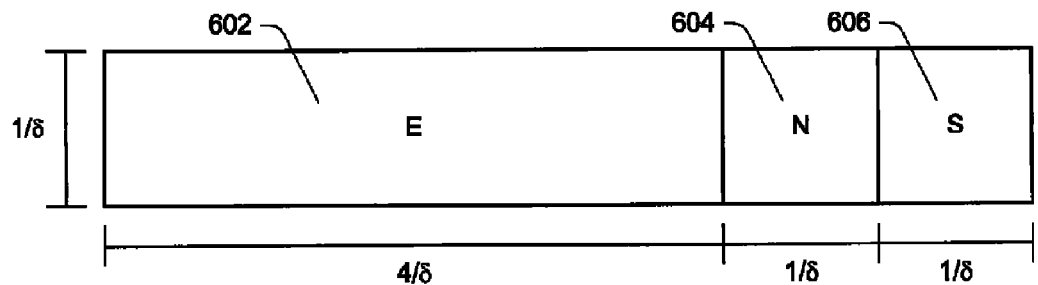
FIG. 15 graphically depicts a polar-capped map.

Exemplary Stretch-Invariant Polar-Capped Maps:

FIG. 15 depicts an exemplary arrangement of information in the form of a stretch-invariant polar-capped map set 600. Map set 600 includes information within rectangle E (equator) 602, which represents the plane chart equatorial map, whose vertical resolution matches that of two azimuthal equidistant polar cap maps, represented by squares 604 and 606, labeled N (north) and S (south), respectively. As a result, map set 600, with sample spacing δ, produces a minimum sampling spectral radius of $\Delta^* = 2/\delta$, for a sampling requirement of $(3/2)\pi^2 \approx 14.8$.

To create an optimal stretch-invariant polar-capped map, for example, as depicted in map set 600, we examine the sampling requirement of a two-component maps covering the hemisphere, containing plane-chart projection 602 near the equator and azimuthal equidistant projection 604 near the north pole. The sampling requirement of such a map is given by $$M_{capped}(\theta) = M_{equi}(\theta) + M_{plane}(\pi/2 - \theta) = 4\theta^2 + 2\pi(\pi/2 - \theta)$$

where θ is the angle from the pole where the equidistant projection transitions to the plane chart. Preferably, we seek a θ that minimizes the sampling requirement. By differentiating and finding the root, it is easy to see that the sampling-requirement minimizing angle occurs at $\theta^* = 45°$ for which the sampling requirement is $3/4\pi^2 = 7.40$. To cover the entire sphere, we can therefore continue the equatorial map 602 to the southern hemisphere and add a third equidistant map 606 covering the south pole to produce a polar-capped map with sampling requirement of roughly 14.80.

Consequently, this new mapping technique represents an improvement of about 54% over the dual stereographic map, about 38% over the cube map (but with half as many map components and significantly less anisotropy), and about 25% over the dual equidistant or plane chart maps (but with much less anisotropy). It is even a slight improvement (about 2.4%), over the unwieldy 20-map icosahedral gnomonic set.

Next we analyzed the structure of the polar-capped map's domain. The domain for each of the two polar caps is $[-1/2, 1/2] \times [-1/2, 1/2]$ since $r(\theta^*)=1/2$, while the equatorial map's domain is $[-1/2, 1/2] \times [-1/8, 1/8]$ since $v(\pi/2-\theta^*)=1/8$. To find the respective sampling densities, the sampling spectral radius must be equal on the three maps. But $\Delta^*/\pi = 1/(\Gamma^*\delta)$, $\Gamma^*_{equi}=\pi/2$, and $\Gamma^*_{plane}=2\pi=4\Gamma^*_{equi}$ so $\delta_{plane}=1/4 \; \delta_{equi}$ to match spectral radii. Thus the resolution of the two polar caps is $1/\delta \times 1/\delta$ and the equatorial map is $4/\delta \times 1/\delta$ to achieve a minimum sampling spectral radius of $\Delta^*=2/\delta$.

It can be seen that the three maps (i.e., 602, 604 and 606) share a common resolution in the second (v) dimension, and so can be adjoined to form a contiguous rectangle with aspect ratio 6×1, as shown in FIG. 15. The map achieves minimum (worst-case) isotropy of $\alpha^*=\sqrt{2}/2 \approx 0.71$ which occurs at the 45° parallel of the plane chart.

It is also noted that aspect ratios of the three maps are either square, or 4×1, and as such may be further advantageously supported by conventional graphics hardware suites having a "powers of 2" constraint on texture resolution.

Figure 23:
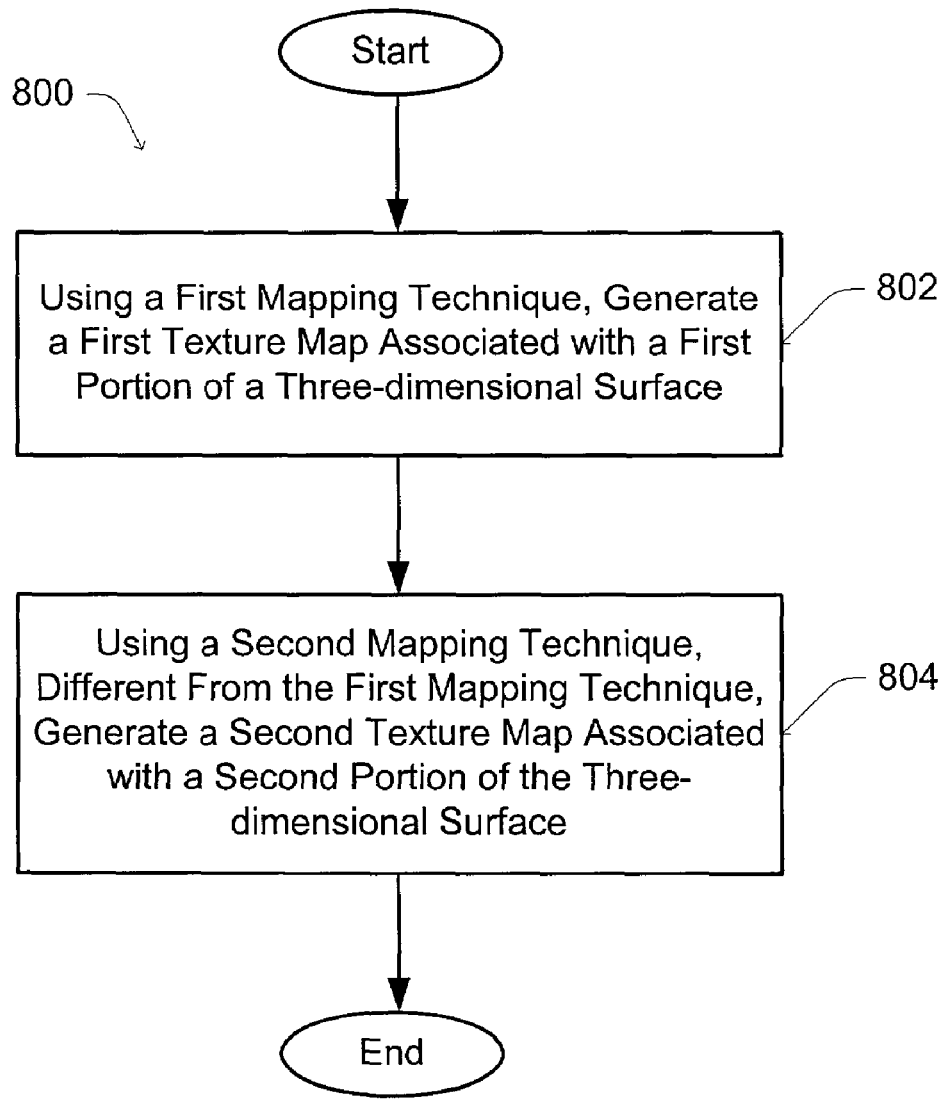
FIG. 23 is flow chart depicting a method for mapping differently developed textures to a three-dimensional surface, in accordance with certain features of the present invention.

Reference is made to FIG. 23, which is flow chart depicting a method 800 for mapping differently developed textures, such as those described above and/or others to a three-dimensional surface, in accordance with certain features of the present invention. As shown, in step 802 a first mapping technique is employed to generate a first texture map that is associated with a first portion of a three-dimensional surface. In step 804, a second mapping technique, which is different from the first mapping technique, is used to generate a second texture map that is associated with a second portion of the three-dimensional surface.

Exemplary Conformal Polar-Capped Maps:

While stretch-invariant polar-capped map set 600 has little anisotropy (the worst case is $\alpha \approx 0.71$ at the 45° parallel of the plane chart), it is instructive to compare it to another exemplary implementation that is conformal everywhere. The conformal polar-capped map set can be arranged like map set 600, by combining stereographic maps at the poles with a Mercator projection at the equator. Such a map has sampling requirement $$M_{capped}(\theta)=M_{stereo}(\theta)+M_{Mercator}(\pi/2-\theta)=16\tan^2(\theta/2)+\pi \ln((1+\cos\theta)/(1-\cos\theta))$$

where $\theta$ is, as before, the transition angle. The optimal angle occurs at $$\theta^*=\cos^{-1}((1-\pi/16)/(1+\pi/16))\approx 47.8°$$

for which the sampling requirement is $\pi(1+\ln(16/\pi))\approx 8.26$. The entire sphere can then be covered with three maps with a sampling requirement of 16.51, which provides about an 11.6% increase over the stretch-invariant polar-capped map set 600 to obtain local isotropy everywhere.

Figure 16:
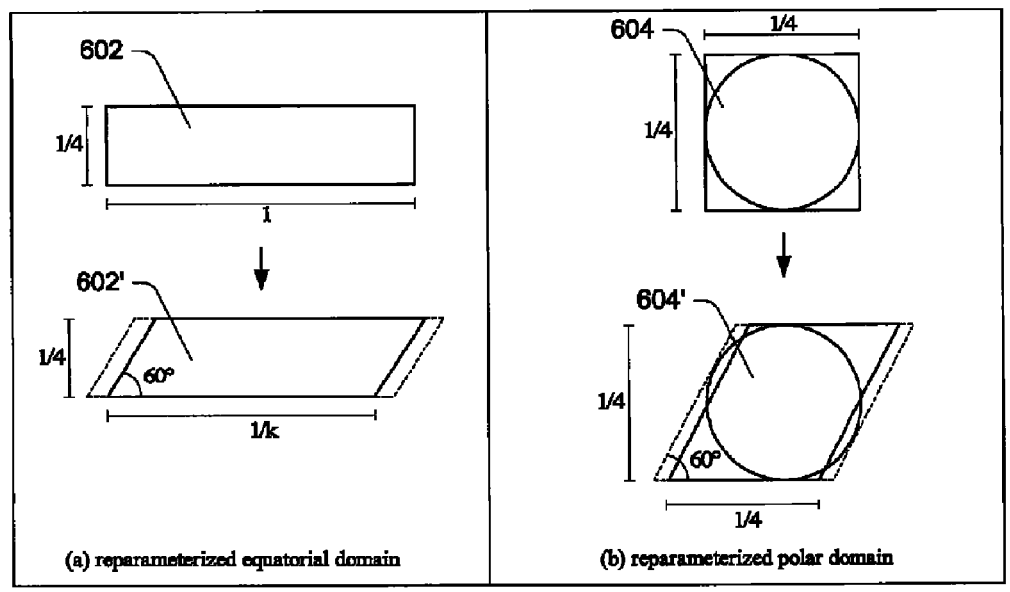
FIG. 16(a-b) graphically depicts the re-parameterization of cylindrical and azimuthal projection information.

Exemplary Hexagonal Re-Parameterization of the Polar-Capped Map:

Reference is now made to FIG. 16(*a*), which illustrates how equatorial map 602 can be hexagonally re-parameterized using a 60° shear, for example, resulting in a reduction of domain area by a factor of k in re-parameterized equatorial map 602'. As demonstrated in FIG. 16(*b*), such a re-parameterization technique is essentially useless for a polar cap map 604, because the domain area needed to contain the disk increases to exactly counteract any potential savings.

Thus, it can been shown that stretch invariant polar-capped map set 600 can be further improved by distorting the rectangular sampling lattice (e.g., 602) into an optimal hexagonal one. This is easily accomplished, for example, by transforming the input of the mapping function through a constant linear transformation $$\hat{S}(u,v) \equiv S(V(u,v)')$$

where $$V \equiv \begin{bmatrix} k & k/2 \\ 0 & 1 \end{bmatrix}$$

and $k \equiv 2\sqrt{3}/3$. The sampling matrix v here is another variant of hexagonal sampling (compare to $v_{hex}$ above).

Since plane chart map 602 is orthogonal, it can be shown that $\hat{S}$ preserves the spectral stretch of S. Also, since plane chart map 602 is periodic in u, the domain required by $\hat{S}$ to cover the hemisphere becomes $[-1/(2k), 1/(2k)] \times [-1/8, 1/8]$, resulting in a reduction of domain area, and hence sampling requirement, by a factor of k due to the reduction in u samples.

Less advantageous is the effect of this re-parameterization on the anisotropy of $\hat{s}$, which now achieves a minimum isotropy of $\alpha^*=1/\sqrt{3}\approx 0.58$, somewhat worse than s. While it would seem that the hexagonal re-parameterization could be done in either the u or v dimension, reducing sampling density in u appears to present a better choice. This is because compressing v tends to exacerbate the anisotropy already present in the 45° parallel, reducing $\alpha^*$ still further, whereas compressing u actually improves anisotropy there. Note that the worst-case anisotropy of $\hat{s}$ is actually achieved at the equator.

Unfortunately, as depicted in FIG. 16, while this re-parameterization technique improves the equatorial map's sampling efficiency, it is essentially useless on the polar cap maps (604 and 606). One reason for this is that the new domain must still cover the disk of radius ½. Fitting this disk into the sheared domain requires an increase in area that exactly counteracts the reduction in sampling density, resulting in a lack of savings. This is an essential limitation of the rectangular sampling lattice.

In certain implementations, therefore, we only hexagonally re-parameterized equatorial map 602. Since map 602' uses ⅔ of the samples, we achieve a sampling requirement of $$(3\pi^2/2)\left(\frac{2}{3k}+\frac{1}{3}\right) \approx 13.48$$

This represents a savings of about 9% over stretch invariant polar-capped map set 600. Note that this additional sampling efficiency will only likely be realizable on graphics hardware suites that support arbitrary sampling aspect ratios in texture rectangles, rather than powers of 2.

Figure 17:
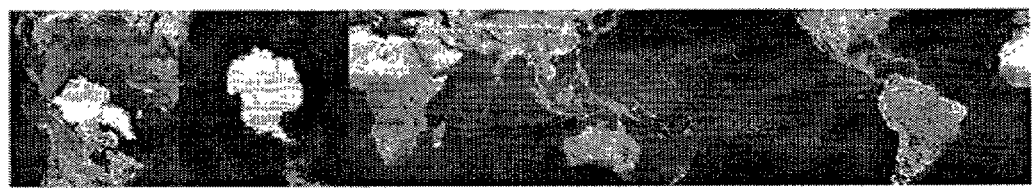
FIG. 17 is an exemplary polar-capped map of the Earth.
Figure 18:
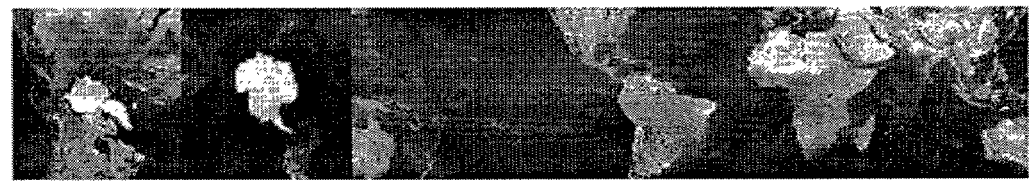
FIG. 18 is an exemplary gnomonic (cube) map of the Earth.
Figure 19:
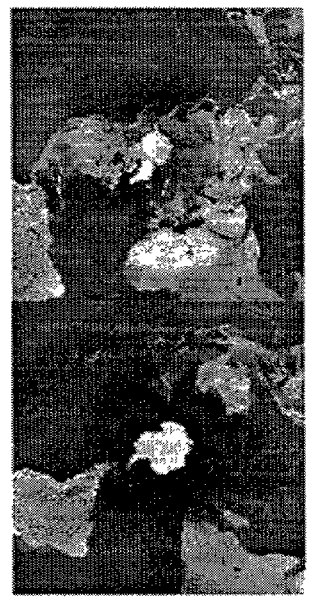
FIG. 19 is an exemplary dual stereographic map of the Earth.
Figure 20:
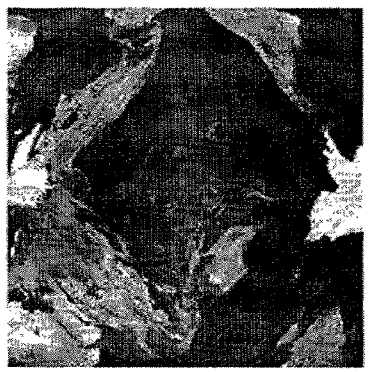
FIG. 20 is an exemplary low-distortion, equal area map of the Earth.
Figure 21:
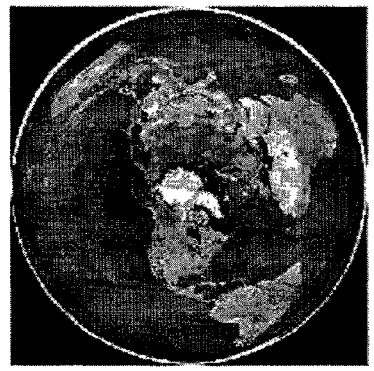
FIG. 21 is an exemplary Lambert equal area map of the Earth.

Exemplary Mapping Results:

FIGS. 17 through 21 depict five exemplary texture maps of the Earth with identical texture areas. AS shown, FIG. 17 is a stretch-invariant polar-capped map set, FIG. 18 is gnomonic cube map set, FIG. 19 is a dual stereographic map set, FIG. 20 is a low distortion area preserving map, and FIG. 21 is a conventional Lambert equal area map. Note particularly the varying sizes of certain features such as the polar ice caps.

Figure 22:
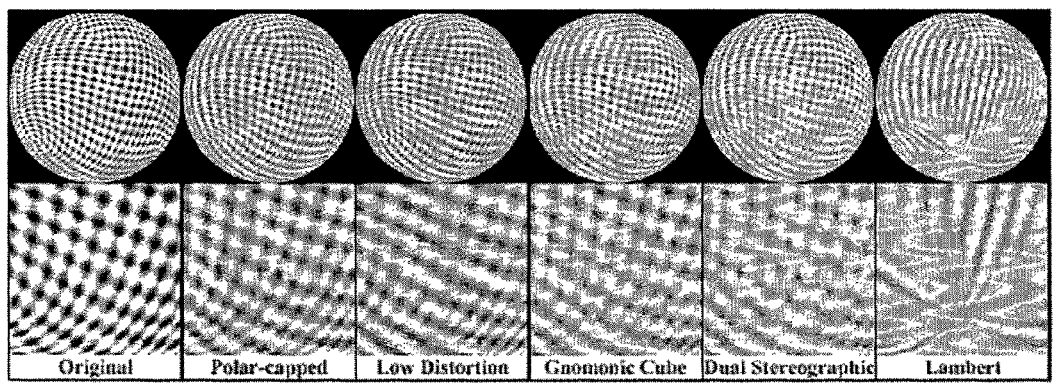
FIG. 22 graphically depicts, in a side-by-side comparison, the experimental results of a spherical test pattern image as projected using different conventional and novel mapping techniques.

FIG. 22 illustratively compares these maps using a high-frequency test pattern on a sphere. This pattern is first sampled into texture maps of identical area for each of the 5 example maps. We then generate orthographic views of the sphere textured with each of these results, shown in the top row. We chose a view where the south pole has been rotated towards the viewer by 45° so that both polar and equatorial regions are visible. The row below zooms in on the south pole of the row above and represents a "bad spot", or most undersampled region, for each of the maps. Here, the polar-capped map does not appear to have a bad spot. The other maps have bad spots at both poles or at the south pole (Lambert).

The sampling efficiency metric presented herein is based on worst-case frequency preservation using the principle that all parts of the sphere must be sampled well to avoid visual artifacts. The bottom row of FIG. 16 validates the mathematical ranking of the maps, which decrease in sampling efficiency from left to right. Discriminating between the low distortion equal area (LDEA) map and the gnomonic cube is difficult. This is probably because we applied the spherical texture using bilinear filtering to simulate typical graphics hardware, which penalizes the more highly anisotropic LDEA map. The top row shows the polar-capped map's sharpness uniformity over the entire sphere. The other maps have noticeable patches of blurriness near the south pole.

Conclusions

Mapping functions used to represent spherical images in graphics systems are significantly less than optimal in terms of sampling efficiency. As described above, we have presented the notion of sampling efficiency and analyzed existing map techniques with new mapping techniques in terms of sampling efficiency and local anisotropy. Our analysis finds that some commonly used maps, like OpenGL's have significant problems/limitations with sampling efficiency. The familiar latitude/longitude (plane chart) parameterization has the best sampling efficiency among maps commonly used before, but it suffers from unbounded anisotropy making it undesirable for most graphics hardware suites.

Consequently, we introduce using pieces of differing projections to form two- and three-component maps that have better sampling efficiency than the best map used previously, with little or no anisotropy. For example, the stretch invariant polar-capped map set 600 saves about 54% over the dual stereographic map, about 38% over the cube map, and about 25% over the latitude/longitude map with minimal anisotropy handled by existing graphics hardware. Moreover, no map, regardless of the number of its components, can exceed its efficiency by more than about 26%, and even the 20-component, icosahedral gnomonic set is inferior. Moreover, implementation need only involve replacing the texture coordinate generation function with a simple alternative.

Furthermore, it is believed that the sampling efficiency metric can be easily extended to Monte Carlo integration for rendering. Here, for example, stratified stochastic sampling seeks to scatter as few samples as possible to arrive at an integral estimate with greatest confidence, and often uses global mapping functions from simple domains to simplify sampling. See, for example, Arvo, J., "Stratified Sampling of Spherical Triangles," *Siggraph '95*, August 1995, 437-438, and Mitchell, D., "Consequences of Stratified Sampling in Graphics," *Siggraph '96*, August 1996, 277-280.

While area-preserving mappings such as these assure that all samples contribute equally to the integral estimate, maps with a great deal of local stretch, a typical consequence of area-preserving mapping to surfaces with curvature, usually increase variance (i.e., reduce the effectiveness of stratification). Thus, a surface integral of spectral stretch, rather than a simple maximum, may be the right comparison metric for mappings used for integrating rather than tabulating functions over surfaces.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims. Additionally, each of the references identified above is expressly incorporated in their entirety herein, by reference, and for all purposes.

What is claimed is:

1. A computer-implemented method comprising:
providing a first texture map for a first portion of a three-dimensional surface, the first texture map being associated with a first mapping technique;
providing a second texture map for a second portion of the three-dimensional surface, the second texture map being associated with a second mapping technique that is different from the first mapping technique;
providing a third texture map for a third portion of the three-dimensional surface, the third texture map being associated with the second mapping technique; and
generating a multiple-component map set that includes at least a portion of the first, the second and the third texture maps, the first texture map including cylindrical projection information, the second texture map including azimuthal projection information, the third texture map including azimuthal projection information, the first portion separating the second portion and third portion, the cylindrical projection information including plane-chart projection information, and wherein the providing the first texture map includes hexagonally re-parameterizing the cylindrical projection information using a linear transform.

2. The method as recited in claim 1, wherein the azimuthal projection information includes equidistant projection information.

3. The method as recited in claim 1, wherein the first and second texture maps are stretch-invariant and have a sampling requirement definable as:

$$M_{capped}(\theta) \equiv M_{equi}(\theta) + M_{plane}(\pi/2 - \theta) = 4\theta^2 + 2\pi(\pi/2 - \theta)$$

where $\theta$ is a transition angle from a defined point on the surface to where the second texture map is adjacent to the first texture map.

4. The method as recited in claim 3, wherein $\theta$ is equal to about 45°.

5. The method as recited in claim 1, wherein the linear transform is definable as:

$$\hat{S}(u,v) \equiv S(V(u,v)')$$

where $$V \equiv \begin{bmatrix} k & k/2 \\ 0 & 1 \end{bmatrix}$$

and $k \equiv 2\sqrt{3}/3$.

6. The method as recited in claim 1, wherein the cylindrical projection information includes information selected from at least one type of projection information selected from a group comprising plane-chart projection information, equal area information, and Mercator information.

7. The method as recited in claim 1, wherein the azimuthal projection information includes information selected from at least one type of projection information selected from a group comprising equidistant projection information, stereographic projection information, gnomonic projection information, and equal area projection information.

8. The method as recited in claim 1, wherein the first portion is significantly adjacent to both the first and second portions, such that the first portion separates the second and third portions.

9. The method as recited in claim 1, wherein the three-dimensional surface is curvilinear.

10. The method as recited in claim 1, wherein the three-dimensional surface includes a spherical surface.

11. The method as recited in claim 1, wherein providing the first texture map further includes generating the first texture map using the first mapping technique, and providing the second texture map further includes generating the second texture map using the second mapping technique.

12. The method as recited in claim 1, wherein at least one of the first and second texture maps includes information based on a rectangular sampling matrix.

13. The method as recited in claim 1, wherein at least one of the first and second texture maps includes information based on a hexagonal sampling matrix.

14. The method as recited in claim 1, wherein providing the first texture map further includes analyzing the texture map per at least one criterion to determine an appropriate texture resolution.

15. The method as recited in claim 1, wherein providing the first texture map further includes analyzing the texture map per at least one metric criterion to determine a requisite number of texture maps in addition to the first texture map.

16. A computer storage device providing computer instructions suitable for performing steps comprising:
    providing a first texture map for a first portion of a three-dimensional surface, the first texture map being associated with a first mapping technique;
    providing a second texture map for a second portion of the three-dimensional surface, the second texture map being associated with a second mapping technique that is different from the first mapping technique;
    providing a third texture map for a third portion of the three-dimensional surface, the third texture map being associated with the second mapping technique, and wherein the third texture map includes azimuthal projection information for the third portion; and
    generating a multiple-component map set that includes at least a portion of the first and the second texture map, the first texture map including at least one of cylindrical projection information or Mercator projection information for the first portion, the second texture map including at least one of azimuthal projection information or stereographic projection information for the second portion,
    wherein:
    the first texture map includes cylindrical projection information for the first portion, and the second texture map includes azimuthal projection information for the second portion,
    the multiple-component map set is a three-component map set,
    the second and third portion are two poles, the first portion is the area between the second and third portions,
    the cylindrical projection information includes plane-chart projection information, and
    the providing the first texture map further includes means for hexagonally re-parameterizing the cylindrical projection information using a linear transform.

17. The computer storage device as recited in claim 16, wherein the azimuthal projection information includes equidistant projection information.

18. The computer storage device as recited in claim 16, wherein the first and second texture maps are stretch-invariant and have a sampling requirement definable as:

$$M_{capped}(\theta) = M_{equi}(\theta) + M_{plane}(\pi/2 - \theta) = 4\theta^2 + 2\pi(\pi/2 - \theta)$$

where $\theta$ is a transition angle from a defined point on the surface to where the second texture map is adjacent to the first texture map.

19. The computer storage device as recited in claim 18, wherein $\theta$ is equal to about 45°.

20. The computer storage device as recited in claim 16, wherein the linear transform is definable as:

$$\hat{S}(u,v) = S(V(u,v)')$$

where $$V \equiv \begin{bmatrix} k & k/2 \\ 0 & 1 \end{bmatrix}$$

and $k \equiv 2\sqrt{3}/3$.

21. The computer storage device as recited in claim 16, wherein the first texture map includes Mercator projection information for the first portion, and the second texture map includes stereographic projection information for the second portion.

22. The computer storage device as recited in claim 21, further comprising computer instructions suitable for performing the step of:
    providing a third texture map for a third portion of the three-dimensional surface, the third texture map being associated with the second mapping technique, and wherein the third texture map includes stereographic projection information for the third portion.

23. The computer storage device as recited in claim 21, wherein the first and second texture maps are conformal and have a sampling requirement definable as:

$$M_{capped}(\theta) = M_{stereo}(\theta) + M_{Mercator}(\pi/2 - \theta) = 16 \tan^2(\theta/2) + \pi \ln((1+\cos\theta)/(1-\cos\theta))$$

where $\theta$ is a transition angle from a defined point on the surface to where the second texture map is adjacent to the first texture map.

24. The computer storage device as recited in claim 23, wherein $\theta$ is equal to about 47.8°.

25. The computer storage device as recited in claim 16, wherein the cylindrical projection information includes information selected from at least one type of projection information selected from a group comprising plane-chart projection information, equal area information, and Mercator information.

26. The computer storage device as recited in claim 16 wherein the azimuthal projection information includes information selected from at least one type of projection information selected from a group comprising equidistant projection information, stereographic projection information, gnomonic projection information, and equal area projection information.

27. The computer storage device as recited in claim 16, wherein the first portion is significantly adjacent to both the first and second portions, such that the first portion separates the second and third portions.

28. The computer storage device as recited in claim 16, wherein the three-dimensional surface is curvilinear.

29. The computer storage device as recited in claim 16, wherein the three-dimensional surface includes a spherical surface.

30. The computer storage device as recited in claim 16, wherein providing the first texture map further includes generating the first texture map using the first mapping technique, and providing the second texture map further includes generating the second texture map using the second mapping technique.

31. The computer storage device as recited in claim 16, wherein at least one of the first and second texture maps includes information based on a rectangular sampling matrix.

32. The computer storage device as recited in claim 16, wherein at least one of the first and second texture maps includes information based on a hexagonal sampling matrix.

33. The computer storage device as recited in claim 16, wherein providing the first texture map further includes analyzing the texture map per at least one criterion to determine an appropriate texture resolution.

34. The computer storage device as recited in claim 16, wherein providing the first texture map further includes analyzing the texture map per at least one metric criterion to determine a requisite number of texture maps in addition to the first texture map.

35. A computing device comprising:
one or more processors;
memory to store computer-program instructions executable by the one or more processors; and
logic module configured to:
provide a first texture map for a first portion of a three-dimensional surface, the first texture map being associated with a first mapping technique and a second texture map for a second portion of the three-dimensional surface, the second texture map being associated with a second mapping technique that is different from the first mapping technique,
output graphically displayable information based on at least a portion of the first and second texture maps, the first texture map including at least one of cylindrical projection information or Mercator projection information for the first portion, and the second texture map including at least one of azimuthal projection information or stereographic projection information for the second portion, and
provide a third texture map for a third portion of the three-dimensional surface, the third texture map being associated with the second mapping technique, wherein
the first texture map includes cylindrical projection information for the first portion, and the second texture map includes azimuthal projection information for the second portion,
the third texture map includes azimuthal projection information for the third portion,
the cylindrical projection information includes plane-chart projection information, and the cylindrical projection information in the first texture map has been hexagonally re-parameterized the using a linear transform.

36. The computing device as recited in claim 35, wherein the azimuthal projection information includes equidistant projection information.

37. The computing device as recited in claim 35, wherein the first and second texture maps are stretch-invariant and have a sampling requirement definable as:

$$M_{capped}(\theta) \equiv M_{equi}(\theta) + M_{plane}(\pi/2-\theta) = 4\theta^2 + 2\pi(\pi/2-\theta)$$

where θ is a transition angle from a defined point on the surface to where the second texture map is adjacent to the first texture map.

38. The computing device as recited in claim 37, wherein θ is equal to about 45°.

39. The computing device as recited in claim 35, wherein the linear transform is definable as:

$$\hat{S}(u,v) \equiv S(V(u,v)')$$

where $$V \equiv \begin{bmatrix} k & k/2 \\ 0 & 1 \end{bmatrix}$$

and $k \equiv 2\sqrt{3}/3$.

40. The computing device as recited in claim 35, wherein the first texture map includes Mercator projection information for the first portion, and the second texture map includes stereographic projection information for the second portion.

41. The computing device as recited in claim 40, wherein the logic is further configured to provide a third texture map for a third portion of the three-dimensional surface, the third texture map being associated with the second mapping technique, and wherein the third texture map includes stereographic projection information for the third portion.

42. The computing device as recited in claim 40, wherein the first and second texture maps are conformal and have a sampling requirement definable as:

$$M_{capped}(\theta) \equiv M_{stereo}(\theta) + M_{Mercator}(\pi/2-\theta) = 16\tan^2(\theta/2) + \pi \ln((1+\cos\theta)/(1-\cos\theta))$$

where θ is a transition angle from a defined point on the surface to where the second texture map is adjacent to the first texture map.

43. The computing device as recited in claim 42, wherein θ is equal to about 47.8°.

44. The computing device as recited in claim 35, wherein the cylindrical projection information includes information selected from at least one type of projection information selected from a group comprising plane-chart projection information, equal area information, and Mercator information.

45. The computing device as recited in claim 35, wherein the azimuthal projection information includes information selected from at least one type of projection information selected from a group comprising equidistant projection information, stereographic projection information, gnomonic projection information, and equal area projection information.

46. The computing device as recited in claim 35, wherein the first portion is significantly adjacent to both the first and second portions, such that the first portion separates the second and third portions.

47. The computing device as recited in claim 35, wherein the three-dimensional surface is curvilinear.

48. The computing device as recited in claim 35, wherein the three-dimensional surface includes a spherical surface.

49. The computing device as recited in claim 35, wherein the logic is further configured to analyze the texture map per at least one criterion to determine an appropriate texture resolution when providing the first texture map.

50. The computing device as recited in claim 35, wherein the logic is further configured to analyze the texture map per at least one metric criterion to determine a requisite number of texture maps in addition to the first texture map when providing the first texture map.

51. The computing device as recited in claim 35, wherein at least one of the first and second texture maps includes information based on a rectangular sampling matrix.

52. The computing device as recited in claim 35, wherein at least one of the first and second texture maps includes information based on a hexagonal sampling matrix.

53. A computer-implemented method comprising:
provide a first texture map for a first portion of a three-dimensional surface, the first texture map being associated with a first mapping technique;
providing a second texture map for a second portion of the three-dimensional surface, the second texture map being associated with a second mapping technique that is different from the first mapping technique, the first texture map including Mercator projection information for the first portion, and the second texture map including stereographic projection information for the second portion;
providing a third texture map for a third portion of the three-dimensional surface, the third texture map being associated with the second mapping technique, and the third texture map including stereographic projection information for the third portion; and
generating a multiple-component map set that includes at least a portion of the first, the second and the third texture map, wherein
the first and second texture maps are conformal and have a sampling requirement definable as:

$$M_{capped}(\theta) \equiv M_{stereo}(\theta) + M_{Mercator}(\pi/2 - \theta) = 16 \tan^2(\theta/2) + \pi \ln((1 + \cos\theta)/(1 - \cos\theta))$$

where $\theta$ is a transition angle from a defined point on the surface to where the second texture map is adjacent to the first texture map.

54. The method as recited in claim 53, wherein $\theta$ is equal to about 47.8°.

* * * * *